US012712750B2

(12) United States Patent
Wright et al.

(10) Patent No.: US 12,712,750 B2
(45) Date of Patent: Aug. 18, 2026

(54) SMART CONTRACTS

(71) Applicant: nChain Licensing AG, Zug (CH)

(72) Inventors: Craig Steven Wright, London (GB); Chloe Tartan, London (GB)

(73) Assignee: nChain Licensing AG, Zug (CH)

( * ) Notice: Subject to any disclaimer, the term of this patent is extended or adjusted under 35 U.S.C. 154(b) by 775 days.

(21) Appl. No.: 17/796,620

(22) PCT Filed: Jan. 19, 2021

(86) PCT No.: PCT/IB2021/050363

§ 371 (c)(1),
(2) Date: Jul. 29, 2022

(87) PCT Pub. No.: WO2021/165754

PCT Pub. Date: Aug. 26, 2021

(65) Prior Publication Data

US 2023/0060559 A1 Mar. 2, 2023

(30) Foreign Application Priority Data

Feb. 19, 2020 (GB) ..................................... 2002305

(51) Int. Cl.
*H04L 29/00* (2006.01)
*G06F 21/64* (2013.01)
*H04L 9/00* (2022.01)

(52) U.S. Cl.
CPC ................ *H04L 9/50* (2022.05); *G06F 21/64* (2013.01)

(58) Field of Classification Search
CPC .......... H04L 9/50; H04L 9/3239; G06F 21/64
See application file for complete search history.

(56) References Cited

U.S. PATENT DOCUMENTS

2019/0199516 A1 6/2019 Carver et al.
2019/0279197 A1* 9/2019 Wright .................. G06F 9/4498
(Continued)

FOREIGN PATENT DOCUMENTS

JP 2019522264 A 8/2019
WO 2018078584 A1 5/2018

OTHER PUBLICATIONS

Rui Oliveira et al: "Hyperledger fabric : a distributed operating system for permissioned blockchains", EuroSys '18: Proceedings of the Thirteenth EuroSys Conference; DI Apr. 23-26, 2018; Porto, Potugal, Apr. 23, 2018 (Apr. 23, 2018), pp. 1-15, (Year: 2018).*
(Continued)

*Primary Examiner* — Jeffrey C Pwu
*Assistant Examiner* — Helai Salehi
(74) *Attorney, Agent, or Firm* — Galvani Smith PLLC; Rowan P. Smith

(57) ABSTRACT

A method performed in a layered network. The layered network comprises a core layer comprising one or more core nodes, one or more intermediate layers each comprising one or more intermediate layer nodes, and one or more outer layers each comprising one or more outer layer nodes. Each of the core nodes is a node of a blockchain network. One or more intermediate layer nodes are smart contracts nodes providing a smart contract service for maintaining the state of a smart contract. One or more outer layer nodes are client nodes of the smart contract service. The method included, by a smart contract node: recording a state of the smart contract in a record of the state maintained at the first smart contract node. In addition, at least a first transaction also recording the state is recorded on a blockchain of the blockchain network.

16 Claims, 20 Drawing Sheets

(56) References Cited

U.S. PATENT DOCUMENTS

2019/0317934 A1 10/2019 Jentzsch et al.
2022/0222245 A1* 7/2022 Pezeshki ............. G06F 16/2379
2023/0014140 A1* 1/2023 Haney ................. G06F 16/2379
2023/0136805 A1* 5/2023 Morais ................. G06Q 20/401 705/75

OTHER PUBLICATIONS

Is "Wust K., et al., "ACE: Asynchronous and Concurrent Execution of Complex Smart Contracts," 2019, Retrieved from the Internet: URL:https://eprint.iacr.org/2019/835.pd on Sep. 25, 2019, 14 pages". (Year: 2019).*
"Wust K., et al., "ACE: Asynchronous and Concurrent Execution of Complex Smart Contracts," 2019, Retrieved from the Internet: URL:https:/eprint.iacr.org/2019/835.po on Sep. 25, 2019, 14 pages". (Year: 2019) (Year: 2019).*
Adams C., et al., "Internet X.509 Public Key Infrastructure," Time-Stamp Protocol (TSP), Network Working Group, Aug. 2001, pp. 1-26.
"ADSS TSA Server System Requirements," Key Points, Ascertia, 2020, 3 pages, Retrieved from the Internet: URL: https://www.ascertia.com/products/adss-tsa-server/key-points/, on Feb. 18, 2020.
Androulaki E., et al., "Hyperledger Fabric : A Distributed Operating System for Permissioned Blockchains," EuroSys'18: Proceedings of the Thirteenth EuroSys Conference, Apr. 23, 2018, pp. 1-15.
Banton C., "Underwriter," Investopedia, Retrieved from the Internet: URL:https://www.investopedia.com/terms/u/underwriter.asp, on Feb. 18, 2020, 10 pages.
Chen J., "Bond Purchase Agreement," Investopedia, Retrieved from the Internet: URL:https://www.investopedia.com/terms/b/bond-purchase-agreement.asp, on Feb. 18, 2020, 9 pages.
Chen J., "Bond Trustee," Investopedia, Retrieved from the Internet: URL:https://www.investopedia.com/terms/b/bond-trustee.asp, on Feb. 18, 2020, 7 pages.
Chen J., "Discount Bond," Investopedia, Retrieved from the Internet: URL:https://www.investopedia.com/terms/d/discountbond.asp, on Feb. 18, 2020, 13 pages.
Chen J., "Primary Market," Investopedia, Retrieved from the Internet: URL:https://www.investopedia.com/terms/p/primarymarket.asp, on Feb. 18, 2020, 10 pages.
Chen J., "Trust Indenture," Investopedia, Retrieved from the Internet: URL:https://www.investopedia.com/terms/t/trust_indenture.asp, on Feb. 18, 2020, 7 pages.
Combined Search and Examination Report under Sections 17 and 18(3) for Application No. GB2002305.7, mailed on Jul. 23, 2020, 6 pages.
Datastax., "About Repair," DSE 5.1 Architecture Guide, Retrieved from the Internet: URL:https://docs.datastax.com/en/dse/5.1/dse-arch/datastax_enterprise/dbArch/archAboutRepair.html , on Feb. 18, 2020, 1 page.
Datastax., "Architecture in Brief," Apache Cassandra 3.X, Retrieved from the Internet: URL: https://docs.datastax.com/en/cassandra-oss/3.x/cassandra/dml/dmlClientRequestsWrite.html, on Feb. 18, 2020, 4 pages.
Datastax., "Hinted Handoff: Repair During Write Path," Apache Cassandra 3.0 for DSE 5.0, Retrieved from the Internet: URL: https://docs.datastax.com/en/archived/cassandra/3.0/cassandra/operations/opsRepairNodesHintedHandoff.html?hl=handoff, on Feb. 18, 2020, 3 pages.
Datastax., "How are Read Requests Accomplished?" Apache Cassandra 3.X, Retrieved from the Internet: URL: https://docs.datastax.com/en/cassandra-oss/3.x/cassandra/dml/dmlClientRequestsRead.html, on Feb. 18, 2020, 7 pages.
Datastax., "How are Write Requests Accomplished?" Apache Cassandra 3.X, Retrieved from the Internet: URL: https://docs.datastax.com/en/cassandra-oss/3.x/cassandra/dml/dmlClientRequestsWrite.html, on Feb. 18, 2020, 2 pages.
Datastax., "How is Data Deleted?," Apache Cassandra 3.0 for DSE 5.0, Retrieved from the Internet: URL: https://docs.datastax.com/en/archived/cassandra/3.0/cassandra/dml/dmlAboutDeletes.html?hl=delete, on Feb. 18, 2020, 3 pages.
Datastax., "How is Data Maintained?," Apache Cassandra 3.X, Retrieved from the Internet: URL: https://docs.datastax.com/en/cassandra-oss/3.x/cassandra/dml/dmlHowDataMaintain.html, on Feb. 18, 2020, 10 pages.
Datastax., "How is Data Written?" Apache Cassandra 3.X, Retrieved from the Internet: URL: https://docs.datastax.com/en/cassandra-oss/3.x/cassandra/dml/dmlHowDataWritten.html, on Feb. 18, 2020, 3 pages.
Downey L., "Fiscal Agent," Investopedia, Retrieved from the Internet: URL:https://www.investopedia.com/terms/f/fiscalagent.asp, on Feb. 18, 2020, 8 pages.
Dr Wright C.S., et al., "R-PUZZLEs, The METANET, and ATTESTATION," nChain, May 2019, 17 pages.
Filho C.I.N.S., et al., "Mandala Networks: Ultra-Small-World and Highly Sparse Graphs," Scientific Reports, Mar. 13, 2015, vol. 5, No. 9082, pp. 1-6.
Financial Pipeline, "How are bonds traded?," Financial Pipeline, Dec. 1, 2004, 11 pages, Retrieved from the Internet: URL: https://staging-finpipev4.kinsta.cloud/trading-bonds/, on Feb. 18, 2020.
Hayes A., "Bond," Investopedia, Retrieved from the Internet: URL:https://www.investopedia.com/terms/b/bond.asp, on Feb. 18, 2020, 23 pages.
Hoogstraaten H., "Black Tulip Report of the Investigation into the DigiNotar Certificate Authority Breach," FOX IT, Aug. 13, 2012, 102 pages.
International Search Report and Written Opinion for International Application No. PCT/IB2021/050363, mailed on May 11, 2021, 18 pages.
Kenton W., "Secondary Market," Investopedia, Retrieved from the Internet: URL:https://www.investopedia.com/terms/s/secondarymarket.asp, on Feb. 18, 2020, 8 pages.
Krawczyk H., et al., "HMAC: Keyed-Hashing for Message Authentication," Feb. 1997, 11 pages.
Massias H., et al., "Design of a Secure Timestamping Service with Minimal Trust Requirement," UCL Crypto Group, 1999, 8 pages.
Morah C., "Why Are Most Bonds Traded on the Secondary Market "Over the Counter"?," Investopedia, Retrieved from the Internet: URL:https://www.investopedia.com/ask/answers/09/bond-over-the-counter.asp, on Feb. 18, 2020, 9 pages.
Murphy C. B., "Over-The-Counter (OTC)," Investopedia, Retrieved from the Internet: URL:https://www.investopedia.com/terms/o/otc.asp, on Feb. 18, 2020, 12 pages.
Nakamoto S, "Bitcoin: A Peer-to-Peer Electronic Cash System," Oct. 31, 2008, 6 pages, Retrieved from the Internet: URL: https://nakamotoinstitute.org/bitcoin/, on Feb. 18, 2020.
"Storage Engine," Cassandra Documentation, 2020, 5 pages, Retrieved from the Internet: URL: https://cassandra.apache.org/doc/latest/architecture/storage_engine.html, on Feb. 18, 2020.
Strlen, "Hacker News," Mar. 14, 2010, 1 page, Retrieved from the Internet: URL: https://news.ycombinator.com/item?id=1191314, on Feb. 18, 2020.
"The Pros and Cons of Zero-Coupon Bonds," Financial Web, 2 pages, Retrieved from the Internet: URL: https://www.finweb.com/investing/the-pros-and-cons-of-zero-coupon-bonds.html, on Feb. 18, 2020.
Wikipedia, "Deterministic Finite Automaton," 2020, 8 pages.
Wikipedia, "Eventual Consistency," 2019, 3 pages.
Wust K., et al.,"ACE: Asynchronous and Concurrent Execution of Complex Smart Contracts," 2019, Retrieved from the Internet: URL:https://eprint.iacr.org/2019/835.pdf on Sep. 25, 2019, 14 pages.
Karl W., et al., "ACE: Asynchronous and Concurrent Execution of Complex Smart Contracts," Cryptology ePrint Archive, 2019, 15 pages, Retrieved from Internet: URL: https://eprint.iacr.org/2019/835.
EP Application No. 21701178.2 Supplementary Search Report dated Jan. 23, 2026, 15 pages.

* cited by examiner 300
303
303
303
302
302
303
301
301
302
302
301
303
302
303
303
Connection Key
Intra-layer
Ancestor
Core ancestor 400
303
303
302
303
301
301
302
302
301
303
302
303
303
303
Connection Key
Intra-layer
Ancestor
Core ancestor 500
Connection Key
Intra-layer
Ancestor
Core ancestor
301
301
301
Layers
i=1
i=2
302
i=2
i=3
303
i=3
i=4
i=4
i=5
304
305
305

| $TxID_1$ | | | |
|---|---|---|---|
| Version | 1 | Locktime | 0 |
| In-count | 1 | Out-count | 2 |
| Input list | | Output list | |
| Outpoint | Unlocking script | Value | Locking script |
| $TxID_0 \parallel 0$ | $< Sig_1 >< P_1 >$ | $dust$ | [Checksig $P_2$] |
| | | 0 | OP_FALSE OP_RETURN $< data_1 >$ |

202 203

| Index | Data | Hash chain element |
|---|---|---|
| 1 | $D_1$ | $H_1 = H(D_1)$ |
| 2 | $D_2$ | $H_2 = H(D_2 \parallel H_1)$ |
| 3 | $D_3$ | $H_3 = H(D_3 \parallel H_2)$ |
| | | ⋮ |
| $n_1$ | $D_{n_1}$ | $H_{n_1} = H(D_{n_1} \parallel H_{n_1-1})$ |

Figure 10

| Index | Data | Public key | Signature |
|---|---|---|---|
| 1 | $D_1$ | $P_{11} = P_1 + H(D_1) \cdot G$ | Sig $(P_{11}, H(D_1))$ |
| 2 | $D_2$ | $P_{12} = P_1 + H(D_2 \parallel P_{11}) \cdot G$ | Sig $(P_{12}, H(D_2))$ |
| 3 | $D_3$ | $P_{13} = P_1 + H(D_3 \parallel P_{12}) \cdot G$ | Sig $(P_{13}, H(D_3))$ |
| | | $\vdots$ | |
| $n_1$ | $D_{n_1}$ | $P_{1n_1} = P_1 + H(D_{n_1} \parallel P_{1(n_1-1)}) \cdot G$ | Sig $(P_{1n_1}, H(D_{n_1}))$ |

Figure 11

| Index | Data | Ephemeral key | Signature |
|---|---|---|---|
| 1 | $D_1$ | $R_{11} = R_1 + H(D_1) \cdot G$ | $< S_1, R_{11} >(H(D_1))$ |
| 2 | $D_2$ | $R_{12} = R_1 + H(D_2 \parallel R_{11}) \cdot G$ | $< S_1, R_{12} >(H(D_2))$ |
| 3 | $D_3$ | $R_{13} = R_1 + H(D_3 \parallel R_{12}) \cdot G$ | $< S_1, R_{13} >(H(D_3))$ |
| | | $\vdots$ | |
| $n_1$ | $D_{n_1}$ | $R_{1n_1} = R_1 + H(D_{n_1} \parallel R_{1(n_1-1)}) \cdot G$ | $< S_1, R_{1n_1} >(H(D_{n_1}))$ |

Key:
Miner
Layer 1 Node
(1201)
Smart Contract
Layer 2 Node
(1202SC)
User
Layer 3 Node
(1203C)
Layer-layer
Connections
Core Ancestor
Connections

1200

| $TxID_0$ [PRIMARY STATE] | | | |
|---|---|---|---|
| Version | 1 | Locktime | 0 |
| In-count | 1 | Out-count | 1 |
| Input list | | Output list | |
| Value | Unlocking script | Value | Locking script |
| $x$ | $< Sig_A >< P_A >$ | $x_1$ | OP_HASH256 < state $s_0$ puzzle > OP_EQUAL [Checksig $P_T$] |

Figure 21

| $TxID_{tr}$ (1) – Partial **[SECONDARY STATE]** | | | |
|---|---|---|---|
| Version | 1 | Locktime | 0 |
| In-count | 0 | Out-count | 1 |
| Input list | | Output list | |
| Value | Unlocking script | Value | Locking script |
| | | $y$ | [Checksig $P_B$] |
| | | | |
| | | | |

Figure 22

| $TxID_{tr}$ (2) – Partial **[SECONDARY STATE]** | | | |
|---|---|---|---|
| Version | 1 | Locktime | 0 |
| In-count | 0 | Out-count | 2 |
| Input list | | Output list | |
| Value | Unlocking script | Value | Locking script |
| | | $y$ | [Checksig $P_B$] |
| | | $z$ | [Checksig $P_T$] |
| | | | |

Figure 23

| $TxID_{tr}$ (3) – Partial **[SECONDARY STATE]** | | | |
|---|---|---|---|
| Version | 1 | Locktime | 0 |
| In-count | 0 | Out-count | 3 |
| Input list | | Output list | |
| Value | Unlocking script | Value | Locking script |
| | | $y$ | [Checksig $P_B$] |
| | | $z$ | [Checksig $P_T$] |
| | | 0 | OP_FALSE OP_RETURN <Trust Indenture> |

Figure 24

| $TxID_{tr}$ (4) - Partial **[SECONDARY STATE]** | | | |
|---|---|---|---|
| Version | 1 | Locktime | 0 |
| In-count | 2 | Out-count | 3 |
| Input list | | Output list | |
| Value | Unlocking script | Value | Locking script |
| $w$ | $< Sig_D >< P_D >$ | $y$ | [Checksig $P_B$] |
| | | $z$ | [Checksig $P_T$] |
| | | 0 | OP_FALSE OP_RETURN <Trust Indenture> |

Figure 25

| $TxID_{tr}$ (5) - Complete **[SECONDARY STATE]** | | | |
|---|---|---|---|
| Version | 1 | Locktime | 0 |
| In-count | 2 | Out-count | 3 |
| Input list | | Output list | |
| Value | Unlocking script | Value | Locking script |
| $w$ | $< Sig_D >< P_D >$ | $y$ | [Checksig $P_B$] |
| $dust$ | $< Sig_B >< P_B >$ | $z$ | [Checksig $P_T$] |
| | | 0 | OP_FALSE OP_RETURN <Trust Indenture> |

Figure 26

| $TxID_{t_f}$ **[PRIMARY STATE]** | | | |
|---|---|---|---|
| Version | 1 | Locktime | 0 |
| In-count | 1 | Out-count | 1 |
| Input list | | Output list | |
| Outpoint | Unlocking script | Value | Locking script |
| $TxID_o \parallel 0$ | <state $s_\theta$ puzzle solution> | $x_2$ | OP_HASH256 <state $f_f$ puzzle> OP_EQUAL [Checksig $P_T$] |

Figure 27

| $TxID_{c_f}$ [PRIMARY STATE] | | | |
|---|---|---|---|
| Version | 1 | Locktime | 0 |
| In-count | 1 | Out-count | 2 |
| Input list | | Output list | |
| Outpoint | Unlocking script | Value | Locking script |
| $TxID_{t_f} \parallel 0$ | <state $f_f$ puzzle solution> | $x_3$ | [Checksig $P_A$] |
| | | $x_4$ | [Checksig $P_T$] |

Figure 28

| $TxID_{re}$ [SECONDARY STATE] | | | |
|---|---|---|---|
| Version | 1 | Locktime | 0 |
| In-count | 1 | Out-count | 1 |
| Input list | | Output list | |
| Outpoint | Unlocking script | Value | Locking script |
| $TxID_T \parallel 1$ | $< Sig_T > < P_T >$ | 0 | OP_FALSE OP_RETURN <Trust Indenture Outcome> |

SMART CONTRACTS

CROSS REFERENCE TO RELATED APPLICATIONS

This application is the U.S. National Stage of International Application No. PCT/IB2021/050363 filed on Jan. 19, 2021, which claims the benefit of United Kingdom Patent Application No. 2002305.7, filed on Feb. 19, 2020, the contents of which are incorporated herein by reference in their entireties.

TECHNICAL FIELD

The present disclosure relates to a method of providing smart contracts using a blockchain.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks. New blocks are created by a process known as "mining", which involves each of a plurality of mining nodes competing to perform "proof-of-work", i.e. solving a cryptographic puzzle based on a pool of the pending transactions waiting to be included in blocks.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, then the transaction (including any user data) will thus remain stored at each of the nodes in the P2P network as an immutable public record.

The miner who successfully solved the proof-of-work puzzle to create the latest block is typically rewarded with a new transaction called a "generation transaction" which generates a new amount of the digital asset. The proof-of work incentivises miners not to cheat the system by including double-spending transactions in their blocks, since it requires a large amount of compute resource to mine a block, and a block that includes an attempt to double spend is likely not be accepted by other nodes.

In an "output-based" model (sometimes referred to as a UTXO-based model), the data structure of a given transaction comprises one or more inputs and one or more outputs. Any spendable output comprises an element specifying an amount of the digital asset, sometimes referred to as a UTXO ("unspent transaction output"). The output may further comprise a locking script specifying a condition for redeeming the output. Each input comprises a pointer to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the P2P network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it nor include it for mining into a block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the miners separate to the blockchain and is updated constantly.

Conventionally the transactions in the blockchain are used to convey a digital asset, i.e. a number of digital tokens. However, a blockchain can also be exploited in order to superimpose additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

SUMMARY

The present disclosure provides a scheme whereby the state of a smart contract is maintained in a layer of smart contract nodes layered around a core of blockchain network nodes, and whereby the state is also recorded on a blockchain of the blockchain network.

According to one aspect disclosed herein, there is provided a method of maintaining a state of a smart contract in a layered network. The layered network comprises a core layer comprising one or more core nodes, one or more intermediate layers each comprising one or more intermediate layer nodes, and one or more outer layers each comprising one or more outer layer nodes. Each of the core nodes is a node of a blockchain network, one or more of the intermediate layer nodes are smart contracts nodes providing a smart contract service for maintaining the state of the smart contract, and one or more of the outer layer nodes are client nodes of the smart contract service. The method comprises, by a first one of the one or more smart contract nodes: recording a state of the smart contract in a record of the state maintained at the first smart contract node. In addition, at least a first transaction also recording the state is recorded on a blockchain of the blockchain network.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 10 schematically illustrates another example of an indexed list for recording an order of a set of data items within a transaction;

FIG. 11 schematically illustrates another example of an indexed list for recording an order of a set of data items within a transaction;

FIG. 14 is a schematic diagram illustrating a secondary state existing in parallel with a primary state;

FIGS. 21 to 24 are a schematic transaction diagrams showing an example of a partially complete trade transaction, in successive stages of partial completion;

FIG. 25 is a schematic transaction diagram showing an example of a complete trade transaction;

FIG. 26 is a schematic transaction diagram showing an example of a transition transaction;

FIG. 27 is a schematic transaction diagram showing an example of a completion transaction; and FIG. 28 is a schematic transaction diagram showing an example of a UTXO set revocation transaction.

DETAILED DESCRIPTION OF EMBODIMENTS

Example System Overview

Figure 1:
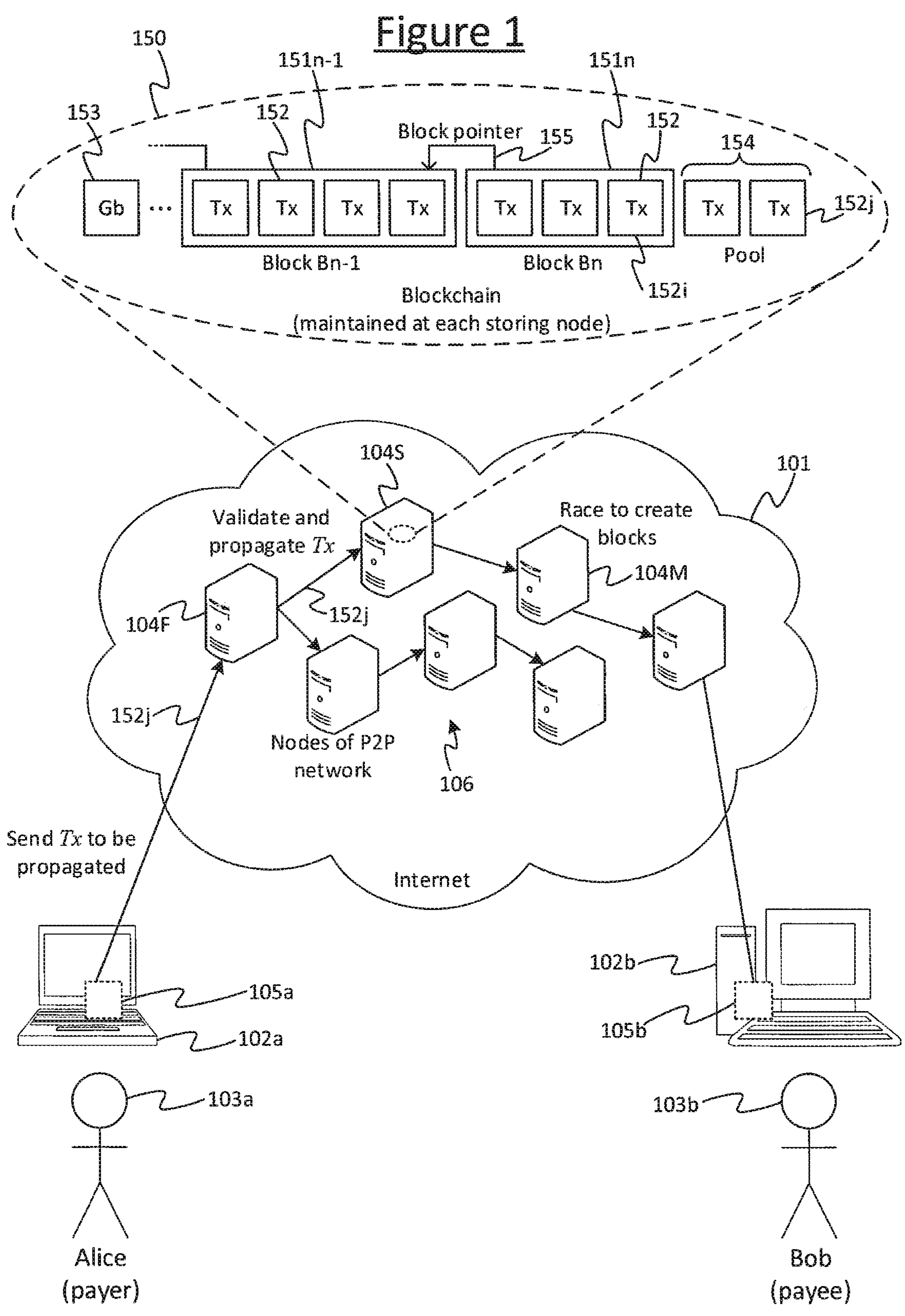
FIG. 1 is a schematic block diagram of a system for implementing a blockchain.

FIG. 1 shows an example system 100 for implementing a blockchain 150. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 of the blockchain network 106 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction **152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the pool 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i*** could equally be called the antecedent or predecessor transaction.

The input of the present transaction **152*j* also comprises the signature of the user 103*a* to whom the output of the preceding transaction 152*i* is locked. In turn, the output of the present transaction 152*j* can be cryptographically locked to a new user 103*b*. The present transaction 152*j* can thus transfer the amount defined in the input of the preceding transaction 152*i* to the new user 103*b* as defined in the output of the present transaction 152*j*. In some cases a transaction 152 may have multiple outputs to split the input amount between multiple users (one of whom could be the original user 103*a*** in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

In either type of model, when a user 103 wishes to enact a new transaction **152*j*, then he/she sends the new transaction from his/her computer terminal 102 to one of the nodes 104 of the P2P validation network 106 (which nowadays are typically servers or data centres, but could in principle be other user terminals). This node 104 checks whether the transaction is valid according to a node protocol which is applied at each of the nodes 104**.

The details of the node protocol will correspond to the type of transaction protocol being used in the blockchain 150 in question, together forming the overall transaction model. The node protocol typically requires the node 104 to check that the cryptographic signature in the new transaction **152*j* matches the expected signature, which depends on the previous transaction 152*i* in an ordered sequence of transactions 152. In an output-based case, this may comprise checking that the cryptographic signature of the user included in the input of the new transaction 152*j* matches a condition defined in the output of the preceding transaction 152*i* which the new transaction spends, wherein this condition typically comprises at least checking that the cryptographic signature in the input of the new transaction 152*j* unlocks the output of the previous transaction 152*i* to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152*j* is valid, the current node forwards it to one or more others of the nodes 104 in the P2P network 106. At least some of these nodes 104 also act as forwarding nodes 104F, applying the same test according to the same node protocol, and so forward the new transaction 152*j* on to one or more further nodes 104, and so forth. In this way the new transaction is propagated throughout the network of nodes 104**.

In an output-based model, the definition of whether a given output (e.g. UTXO) is spent is whether it has yet been validly redeemed by the input of another, onward transaction **152*j* according to the node protocol. Another condition for a transaction to be valid is that the output of the preceding transaction 152*i* which it attempts to spend or redeem has not already been spent/redeemed by another valid transaction. Again if not valid, the transaction 152*j*** will not be propagated or recorded in the blockchain. This guards against double-spending whereby the spender tries to spend the output of the same transaction more than once.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block **151*n* pointing back to the previously created block 151*n*-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106**, this therefore provides an immutable public ledger of the transactions.

The pool 154 is sometimes referred to as a "mempool". This term herein is not intended to limit to any particular blockchain, protocol or model. It refers to the pool of transactions which a miner has accepted for mining and for which the miner has committed not to accept any other transactions attempting to spend the same output.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151*n*, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151*n*. This reward gives an incentive for the miners 104M to participate in the proof-of-work race. Often a regular (non-generation) transaction 152 will also specify an additional transaction fee in one of its outputs, to further reward the winning miner 104M that created the block 151*n* in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. The node software may be implemented in one or more applications at the application layer, or a lower layer such as the operating system layer or a protocol layer, or any combination of these. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the forwarding nodes 104F of the P2P network 106.

This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152*j*, it handles it in accordance with the node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any storage node 104S that receives the transaction 152*j* will add the new validated transaction 152 to the pool 154 in the copy of the blockchain 150 maintained at that node 104S. Further, any forwarding node 104F that receives the transaction 152*j* will propagate the validated transaction 152 onward to one or more other nodes 104 in the P2P network 106. Since each forwarding node 104F applies the same protocol, then assuming the transaction 152*j* is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different nodes 104 may receive different instances of a given transaction first and therefore have conflicting views of which instance is 'valid' before one instance is mined into a block 150, at which point all nodes 104 agree that the mined instance is the only valid instance. If a node 104 accepts one instance as valid, and then discovers that a second instance has been recorded in the blockchain 150 then that node 104 must accept this and will discard (i.e. treat as invalid) the unmined instance which it had initially accepted.

UTXO-Based Model

Figure 2:
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the (distributed) ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

Depending on implementation, the signature required may for example be a conventional ECDSA (elliptic curve digital signature algorithm) signature, DSA (Digital Signature Algorithm) signature or RSA (Rivest-Shamir-Adleman) signature, or any other suitable form of cryptographic signature. The challenge for the signature may for example be implemented as a standard pay-to-public key (P2PK) puzzle or P2PK hash (P2PKH) puzzle, or an alternative such as an R-puzzle may instead be implemented as a means to a signature. The present example uses P2PK by way of illustration.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

$$\langle Sig\ P_A\rangle\langle P_A\rangle\|[Checksig\ P_A]$$

where "‖" represents a concatenation and "< . . . >" means place the data on the stack, and "[ . . . ]" is a function comprised by the unlocking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

A hash referred to anywhere herein may refer for example be implemented by a SHA (Secure Hash Algorithm) hash function, or HMAC (hash-based message authentication code) hash function, or any other suitable form of cryptographic hash function known in the art.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor mined into blocks 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160<H($P_A$)>OP_EQUALVERIFY OP_CHECKSIG. "OP_ . . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Layered Network

Layered Network Structure: A layered network is an overlay network layered on top of a communication channel. For instance, the communication channel may be an underlying infrastructure network such as a personal area network, a local area network (e.g. an inter-company P2P network) or a wide area network such as the internet. In other examples, the layered network may be a network of nodes connected via wired connections. In yet other examples, the connections may be wireless connections, e.g. Bluetooth or Wi-Fi connections. In some examples, some or all of the above example connections may be used to form the layered network.

Some or all of the nodes are the network are configured to connect to (i.e. join or re-join) the layered network according a connection protocol. The connection protocol may vary according to the particular layer of the network in which the connecting node is connecting to (i.e. attempting to join or re-join). Before the connection protocol is described in detail, a series of example layered networks that may be created, or enforced, by the connection protocol will be described. However it will be appreciated that these are only illustrative examples, and in general any layered network that obeys the connection protocol may be created.

Figure 3:
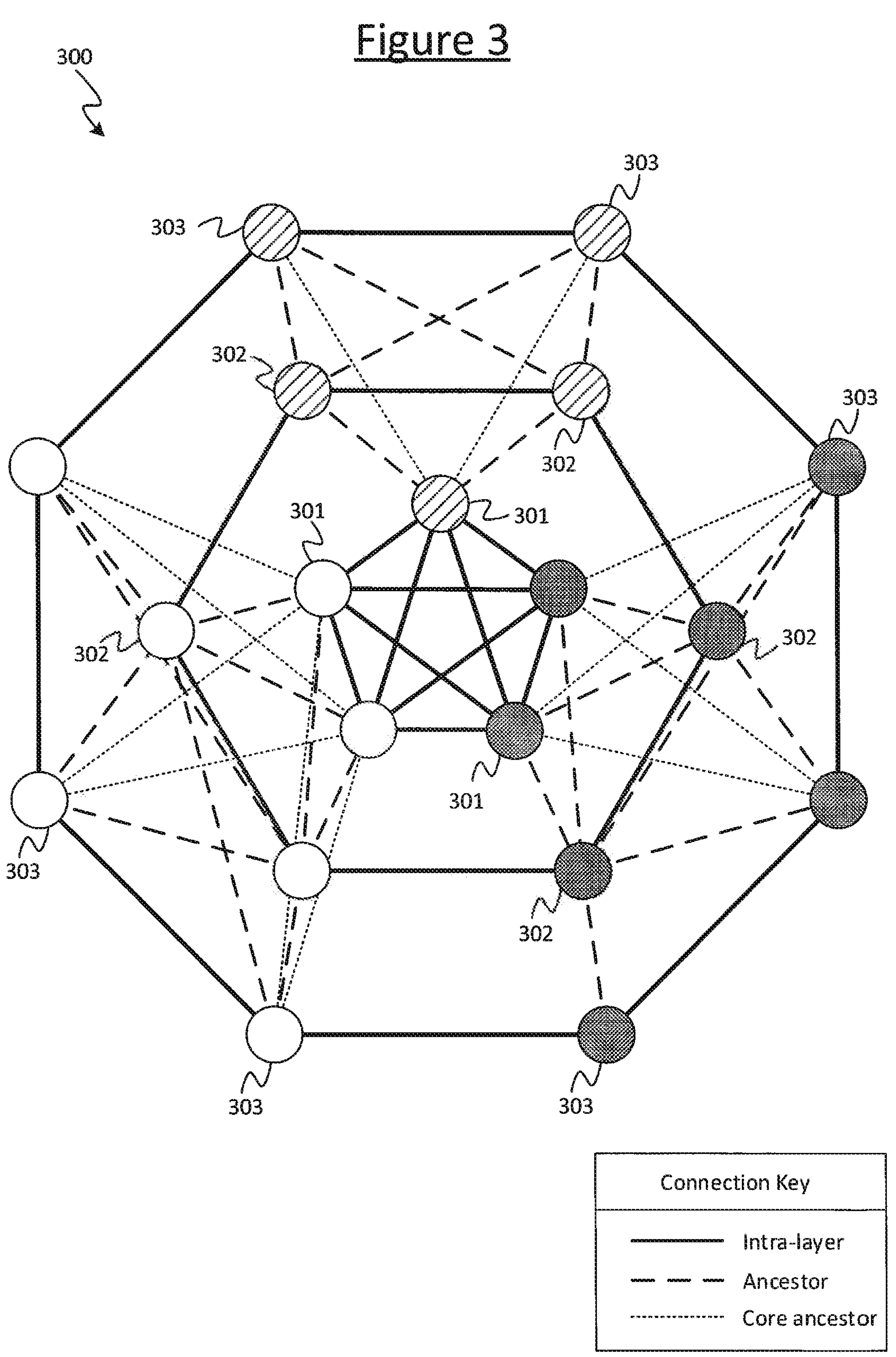
FIG. 3 is a schematic representation of an example of a layered network.
Figure 5:
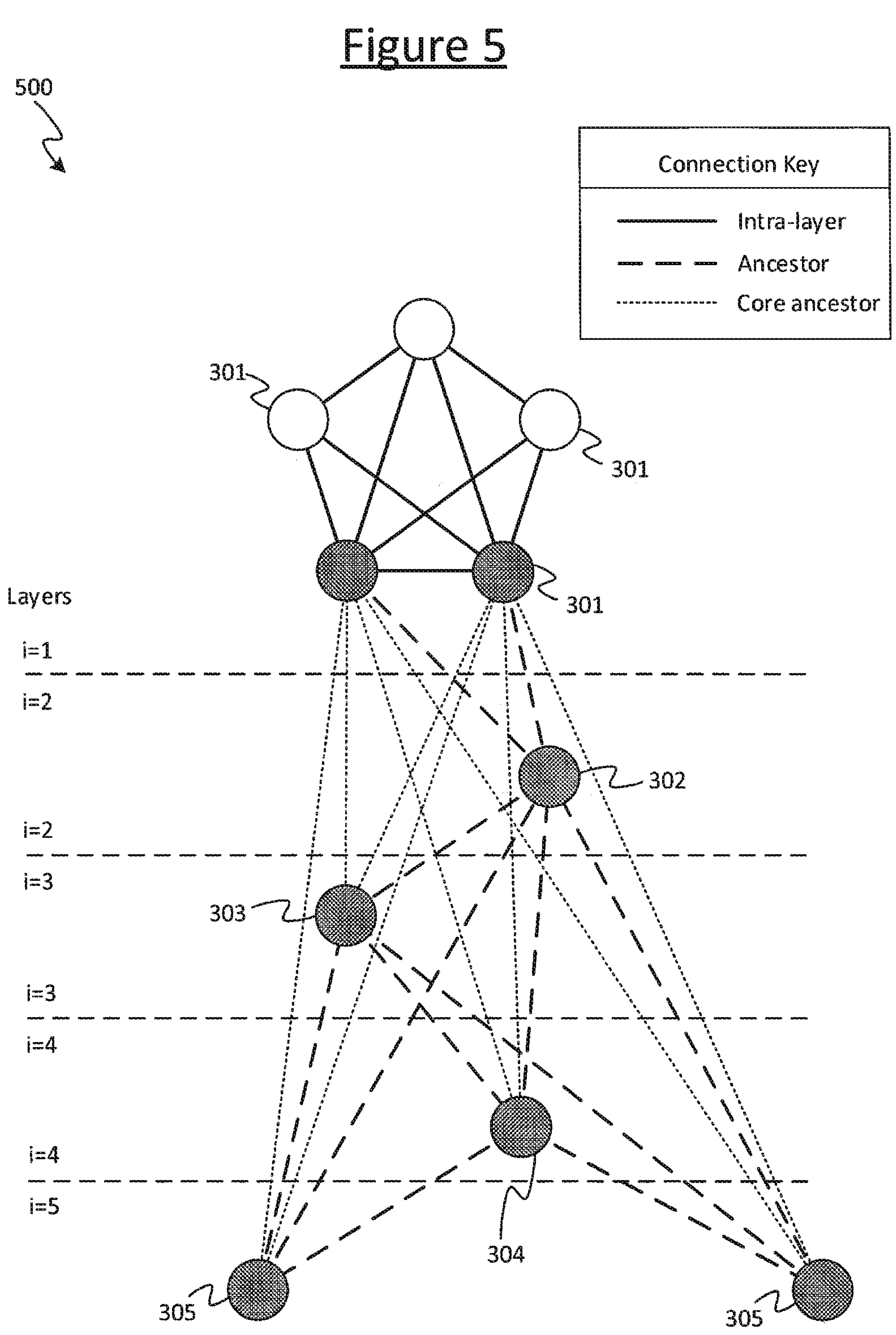
FIG. 5 is another schematic representation of an example of a layered.
Figure 6:
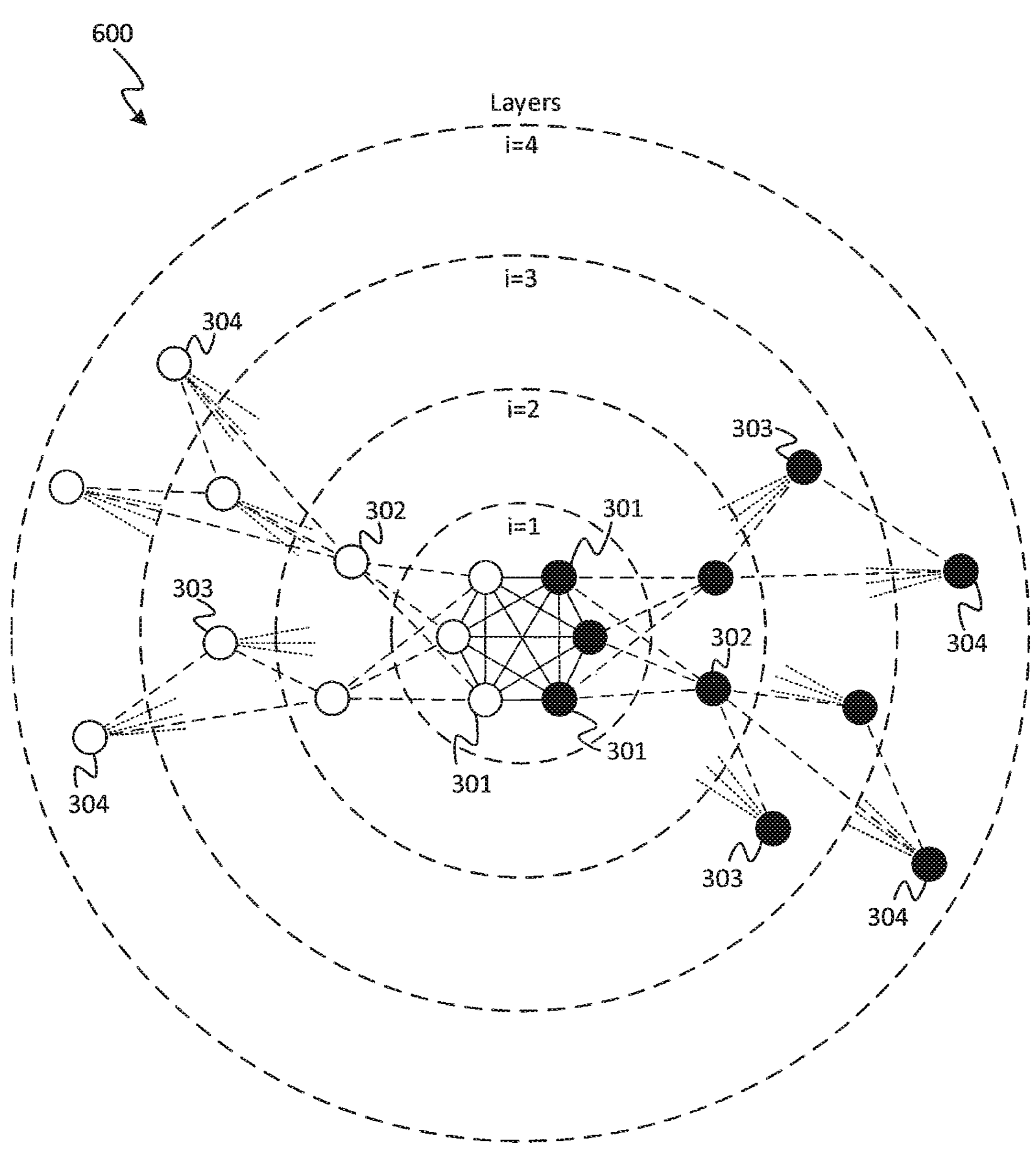
FIG. 6 is another schematic representation of an example of a layered network.

FIG. 3 illustrates a schematic representation of an example of a layered network (LN) 300. In general, a LN includes a core network (or core layer) made up of core nodes 301, and a series of layers (or shells). The core layer is also referred to as the first layer of the LN. The series of layers extend outward of the core layer, in order, from a second layer made up of second nodes 302, to one or more outer layers. Each outer layer is made up of a set of outer nodes 303. Only one outer layer is shown in FIG. 3 but it will be appreciated that a LN may comprise any number of outer layers. As a particular example, FIG. 5 illustrates an example of a LN 500 comprising five layers, and FIG. 6 illustrates an example of a LN 600 comprising four layers.

The example LN 300 of FIG. 3 comprises five core nodes 301, six second nodes 302 and eight outer nodes 303. In some LNs 300, the number of nodes may increase with each layer, i.e. the core layer is made up of the least number of nodes and the outermost layer is made up of the greatest number of nodes. In other examples, one or more of the layers between the core layer and outermost layer may be made up of the greatest number of nodes. In this example, the core layer is the innermost layer of the LN 300, the second layer is an intermediate layer and the outer layer, being the only outer layer, is the outermost layer.

The core layer (a network within the LN) in this example forms a complete graph, i.e. each core node 301 is connected to each other core node 301. For a core layer of five core nodes 301, in the example given the core layer requires ten distinct core connections (i.e. a connection between two core nodes). In other examples (e.g. FIG. 4), the core layer may not be a complete graph. The core layer may form a "near-complete graph". In a near-complete graph, at least one core node 301 is not connected to at least one other core node 301. It may be that only one core connection is missing. In a particular example of a near-complete graph, each core node 301 may be connected to one or more but not all of the other core nodes 301.

The second layer comprises second nodes 302. Note that the term "second node" is used only as a label for nodes 302 that are situated, by construction, in the second layer of the LN 300. Each second node 302 is connected to at least one core node 301. In some examples, each second node 302 may be connected to only one core node 301. Alternatively, some or all of the second nodes 302 may be connected to more than one core node 301. For instance, some or all of the second nodes 302 may connect to each and every one of the core nodes 301. In the example LN 300 of FIG. 3, each core node 301 is connected to two second nodes 302. However, in this example, some second nodes 302 (those shown as striped circles) are connected to one core node 301, whilst some second nodes 302 (those shown as white circles, and those shown as shaded circles) are connected to two core nodes 301. Second nodes 302 (and outer nodes 303 of outer layers) that are connected to the same core nodes 301 are referred to as a "community". For instance, each white node together forms one community, each striped node together forms a community, and each shaded node together forms yet another community. Connections between the second nodes 302 and the core nodes 301 are referred to as "ancestor connections" and are shown as wide dotted lines.

In the example of FIG. 3, each second node 302 is connected to two other second nodes 302. In some examples, some or all of the second nodes 302 may not form connections with other second nodes, e.g. some second nodes 302 may be connected to other second nodes 302 whilst some second nodes may be connected to other second nodes 302. These "intra-layer" connections are shown as solid lines between nodes in FIG. 3.

The outer layer of FIG. 3 comprises outer nodes 303. Note that the term "outer" in "outer layer" here does not in itself necessarily limit to the outermost layer of the LN network as a whole, though that is one possibility. Each outer node 303 is connected to at least one second node 302. In some examples, each outer node 303 may be connected to only one second node 302. Alternatively, some or all of the outer nodes 303 may be connected to more than one second node 302. For instance, some or all of the outer nodes 303 may connect to each and every one of the second nodes 301. In the example LN 300 of FIG. 3, each outer node 303 is connected to two second nodes 302. Some second nodes 302 (i.e. the striped nodes) are connected to two outer nodes 303, and some second nodes 302 (i.e. the white nodes and shaded nodes) are connected to three outer nodes 303.

In the example of FIG. 3, each outer node 303 is connected to two other outer nodes 303 of the same layer. In some examples, some or all of the outer nodes 303 may not form any connections with other outer nodes 303 of the same layer. Some or all of the outer nodes 303 may form at least one connection with another outer node 303 of the same layer.

As well as being connected to at least one second node 302, each outer node 303 is also connected to at least one core node 301. A connection between an outer node 303 and a core node 301 is referred to as a "core ancestor connection" and is shown as a thin dotted lines. Each outer node 303 may be connected to each of the core nodes 301 that their ancestral second node(s) 302 is/are connected to. As shown in FIG. 3, each outer node 303 may be connected to each of the core nodes 301 that their ancestral second node(s) 302 is/are connected to, and to no other core nodes 301. In this case, each outer node 303 belongs to a single community.

Figure 4:
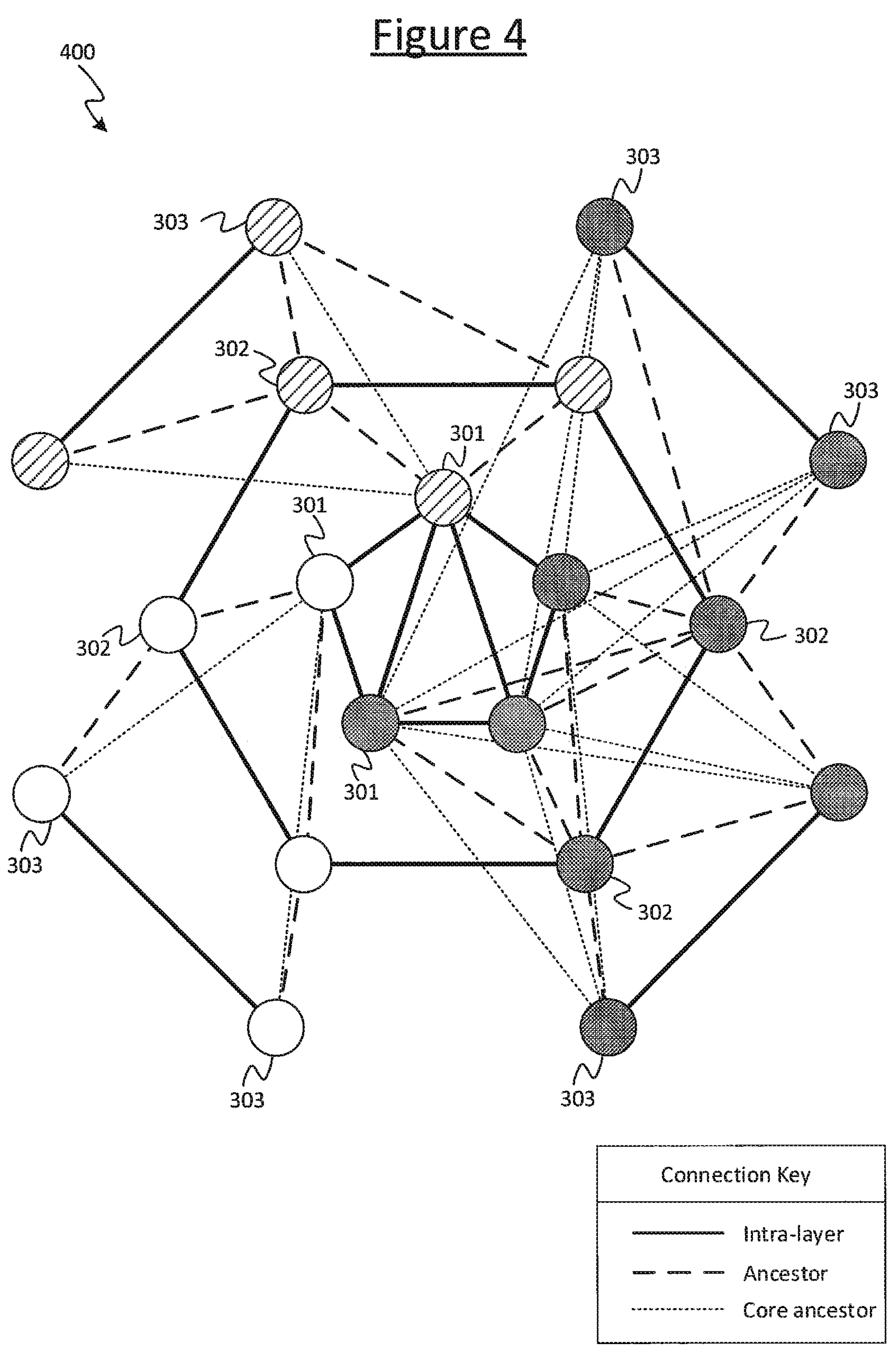
FIG. 4 is another schematic representation of an example of a layered network.

FIG. 4 illustrates a schematic representation of another example of a LN 400. Like the LN 300 of FIG. 3, the example LN 400 comprises a core layer, a second layer and an outer layer. These example LNs 300, 400 share the same number of nodes (i.e. five core nodes 301, six second nodes 302 and eight outer nodes 303), but include a different number of connections. For instance, in this example the core layer is not a complete graph as some connections between core nodes 301 are not present. Another difference is that two communities (white nodes and shaded nodes) comprise a single core node 301, whilst another community (shaded nodes) comprises three core nodes 301. Yet another difference is that the degree of nodes in the outer shell of LN 400 is now one, unlike the degree of nodes in the outer shell of LN 300 which is two. That is, in this example LN 400, each outer node 303 is connected to a single other outer node 303. Therefore the nodes of different layers have a different degree.

FIG. 5 illustrates a schematic representation of another example of a LN 500. In this example, only some core nodes 301 are connected to second nodes and outer nodes 303. That is, in this example some core nodes 301 only form connections with other core nodes 301. Therefore in this example the LN 500 comprises a single community (shaded nodes). The LN 500 of his example comprises five layers: a core layer, a second layer, and three outer layers. The core layer is made up of five core nodes 301 that form a near-complete graph. In this example of a near-complete graph, only a single core connection is missing. The second layer is made up of a single second node 302 which is connected to two core nodes 301. The second layer is made up of a single second node 302 which is connected to two core nodes 301. The third layer is made up of a single outer node 303 which is connected to the second node 302 via an ancestor connection. The outer node 303 of the third layer is also connected to the two core nodes 301 that the second node 302 is connected to. The outer node 303 is connected to the two core nodes 301 via respective core ancestor connections. The fourth layer is also made up of a single outer node 304. The outer node 304 of the fourth layer is connected to the outer node 303 of the third layer, via an ancestor connection, and to the second node 302, via an ancestor connection. The outer node 304 of the fourth layer is also connected to the two core nodes 301 that the second node 302 and the outer node 303 of the third layer are connected to. The outer node 304 is connected to the two core nodes 301 via respective core ancestor connections. Finally, the fifth layer is made up of two outer nodes 305. The two outer nodes 305 of the fifth layer are connected to the outer node 304 of the fourth layer, and to the outer node 303 of the third layer, and to the second node 302, wherein each connection is an ancestor connection. The two outer nodes 305 are also connected to the two core nodes 301 via core ancestor connections. In this example LN 500, the node of the second layer and the nodes of the outer layers are not connected to any other nodes of the same layer.

FIG. 6 illustrates a schematic representation of another example of a LN 600. This LN comprises two communities of nodes, as illustrated by the white nodes and the black nodes. In this example the core layer forms a complete graph (i.e. network of nodes). Each community comprises a distinct set of three core nodes 301. This example LN 600 comprises four layers (a core layer, a second layer and two outer layers). Each node of an outer layer is connected to one node in a preceding layer. Like the example LN 500 of FIG. 5, the nodes of the second layer and the nodes of the outer layers are not connected to any other nodes of the same layer.

In some embodiments, the LN 300, 400, 500, 600 (denoted by "300" from now on for brevity) may be a "blockchain layered network (BLN)". The term BLN is defined herein as a layered network that comprises a blockchain network, or at least part of a blockchain network, e.g. the blockchain network 106 described with reference to FIG. 1.

BLNs are inspired by Mandala networks and share some similar features but are designed to allow more flexible and desirable connectivity structures, e.g. for service and user networks that utilize the blockchain network 106.

A BLN 300 may comprises at least part of a blockchain network 106 at its core. In general, the nodes of the layered network are overlaid on an underlying infrastructure network such as the internet 101. Some or all of the core nodes are nodes 104 of the blockchain network 106. They may comprise mining nodes 104M, storage nodes 104S, or a combination thereof. In embodiments each of the core nodes is a mining node 104M and/or storage node 104S (e.g. full copy node).

Each of the outer nodes 303 (or each of the outer nodes of the outermost layer) may be an end-user node, comprising the computer equipment of a user. This could be an individual user or an organization such as a company, academic institution, or government institution, etc. Hence each outer node 303 may comprise one or more user terminals and/or a server comprising one or more server units at one or more sites. Each outer node 303 comprises memory comprising one or more memory units, and processing apparatus comprising one or more processing units. These may for example take any of the forms of memory medium and/processor as those discussed previously in relation to other network elements or user equipment. The memory stores client software arranged to run on the processing apparatus, wherein the client software is configured so as when run to operate the node as a client of a protocol that obeys the connection protocol in accordance with any of the following embodiments or similar. Optionally, one or more of the end-user nodes may comprise the user equipment 103 of a user 102 of the blockchain network 106, and the client software may comprise a blockchain wallet application 105 or the like.

Each second node 302 may take the form of a server comprising one or more physical server units. Each such node comprises memory comprising one or more memory units and processing apparatus comprising one or more processing units. These may for example take any of the forms of memory medium and/processor as those discussed previously in relation to other network elements. The memory stores software arranged to run on the processing apparatus of the second node 302. This software is configured so as when run to obey the connection protocol in accordance with any of the following embodiments or similar. In some embodiments, the software is configured so as when run to provide a service that operates in accordance with any of the embodiments described below or similar.

In some examples, some or all of the second nodes 302 may operate a smart contract service. The smart contract service is configured to perform a predefined operation in response to, and based on, a blockchain transaction transmitted to the smart contract service by one of the other nodes of the LN 300, e.g. by an outer node 303. For instance, the smart contract may transmit a blockchain transaction to a core node 301 in response to receiving a particular blockchain transaction from an outer node 303.

In other examples, some or all of the second nodes 302 may operate, amongst them, a distributed database. That is, each second node 302 that operates the distributed database is configured to store data received from another node of the LN 300, e.g. an outer node 303. The second node 302 that receives and stores data may be configured to propagate the data to other second nodes 302 that are also operating the distributed database.

The nodes 301, 302, 303 are configured to form connections between one another at the overlay network level. That is, the nodes 301, 302, 303 of the layered network are configured to obey an overlay network protocol which specifies what connections they can and cannot form with other nodes 301, 302, 303 of the layered network. Hence, although all the nodes may be (but not necessarily) physically capable of connecting to one another via the underlying infrastructure (e.g. the internet), when they are participating as nodes 301, 302, 303 of the layered network, operating in accordance with the relevant overlay network protocol of the layered network 300, then the connections between such nodes 301, 302, 303 may be more limited. A connection between two nodes 301, 302, 303 of the layered network 300 means those nodes can communicate directly, which in this context means without having to perform a hop via another node 301, 302, 303 of the layered network 300. In the context of an overlay network such as the layered network, a "connection" means a connection (i.e. edge) at the level of the layered network 300 (i.e. the level of the overlay network protocol of the layered network).

In embodiments where the LN 300 is a BLN, some or all of the second nodes 302 may be configured to transmit blockchain transactions to the core nodes 301 that those second nodes 302 are connected to. In some examples, a second node 302 may generate a blockchain transaction before transmitting it to the core node(s) 301. In other examples, a second node 302 may forward the blockchain transaction to the core node(s) 301. For instance, the second node 302 may receive the blockchain transaction from an outer node 303, and then send the received blockchain transaction to the core node(s) 301. Similarly, a given second node 302 (i.e. some or all of the second nodes) may be configured to obtain blockchain transactions from the core node(s) 301 and/or outer nodes 303 that are connected to a given second node 302.

Additionally or alternatively, some or all of the outer nodes 303 may be configured to transmit blockchain transactions to the core node(s) 301 that they are connected to. The outer nodes 303 may also be configured to transmit blockchain transactions to the second node(s) 302 that they are connected to. In some examples, an outer node 303 may transmit a blockchain transaction to a second node 302 and to a core node 301.

Some or all of the outer nodes 303 may be configured to transmit a blockchain transaction to other outer nodes 303, e.g. outer nodes in the same layer, or outer nodes of the previous layer or the next layer in the ordered set of layers.

In embodiments where the core nodes 301 of the BLN 300 each perform the role of a blockchain node 104, some or all of the second nodes 302 and/or outer nodes 303 may be configured to request confirmation that a given transaction has been accepted in the pool of transactions of the mining node 104M that a given second node 302 or outer node 303 is connected to. The pool 154 (sometimes referred to as a mempool) comprises transactions that have been validated according to a set of consensus rules of the blockchain network 106. If a transaction (e.g. a “first transaction”) is included in the pool 154, a mining node 104M will not accept another transaction (e.g. a “second transaction”) that attempts to double spend an output referenced by an input of the first transaction. Therefore second nodes 302 and/or outer nodes 303 can query a core node 301 to check that a transaction (e.g. a transaction submitted by the node 302, 303 to the blockchain network 106) has been accepted, or check whether a transaction (e.g. a transaction received from another node of the BLN 300) is a double spend attempt. The core nodes 301 are configured to transmit the reply to the request to the requesting node 302, 303.

Additionally or alternatively, the second nodes 302 and/or the third nodes 303 may be configured to transmit a request to a core node 301 for a Merkle proof of a transaction that has been mined in a block 151 of the blockchain 150. Merkle proofs will be familiar to the skilled person. A Merkle proof is a sequence of hashes which trace back to the Merkle root. To verify whether a transaction has been mined in a block 151, a node 302, 303 takes the hash of the transaction, concatenates it with a first hash in the sequence of hashes of the Merkle proof (i.e. a hash partner at the same level of the Merkle tree as the hash of the transaction), and hashes the result. This process of concatenation and hashing is repeated until all of the hashes in the Merkle proof have been utilized. If the resulting hash is identical to the Merkle root, the transaction must be included in the Merkle tree, and therefore the block 151. The core nodes 301 are configured to transmit the Merkle proof to the requesting node 302, 303.

Additionally or alternatively, the second nodes 302 and/or the third nodes 303 may be configured to transmit a request to a core node 301 for a block header of a given block 151. Amongst other data, the block header comprises the Merkle root of the transactions mined into that block 151. The core nodes 301 are configured to transmit the Merkle proof to the requesting node 302, 303.

In some embodiments, some or all of the core nodes 301 may be configured to transmit a set of transactions to some or all of the second node(s) 302 and/or some or all of the outer node(s) that are connected to the core node 301. The transactions in the set may share a common attribute. For instance, a core node 301 may transmit all transactions that include a specific protocol flag. The flag may be included in an output of the transactions, e.g. in an unspendable output. As another example, the transactions may comprise a specific (and same) blockchain address, e.g. they may be payable to the same blockchain address. An outer node 303 may have an agreement with the core node 301 that the core node 301 will send any transactions payable to an address associated with the outer node 303. As yet another example, the transactions may comprise a secondary consensus ruleset. That is, the transaction may include, in an output, more than one control branch, each control branch being specific to a respective consensus ruleset. The output may comprise a first control branch specific to a first ruleset and a second control branch specific to a second ruleset (the two control branches may be included in an if-else condition). If the node 302, 303 is configured to implement the second ruleset, the core node 301 may transmit the transaction to the node 302, 303. If the node 302, 303 is neither configured to implement the first ruleset nor the second ruleset, the core node does not transmit the transaction to the node 302, 303.

A core node 301 that is a mining node 104M may include an identifier (e.g. a “Miner ID”) specific to that mining node 104M in a generation transaction (also referred to as a “coinbase” transaction) mined into a block 151 by that mining node 104M. Other nodes of the BLN 300 may use the identifier to identify that mining node 104M on the network.

Another way of identifying nodes 301, 302, 303 of the LN 300 is by way of digital certificates. Some or all of the nodes 301, 302, 303 may be associated with a digital certificate. The digital certificate includes, and attests to, an identifier of a respective node, e.g. a public key associated with that node, a network address (e.g. an IP address) of the node, etc. A node of the LN 300 may use the digital certificate of a different node to connect to that node. For example, an outer node 303 may obtain a digital certificate from a second node 302 and use the identifying information of the second node included in the digital certificate to connect to the second node 302.

Nodes of a given layer may issue digital certificates to nodes of a next layer in the ordered set of layers, i.e. core nodes 301 may issue digital certificates to second nodes 302, second nodes 302 may issue digital certificates to outer nodes 303 of a first outer layer, and so on. In some examples, nodes of a given layer may issue digital certificates to nodes of the same layer, e.g. a second node 302 may issue a respective digital certificate to one or more other second nodes 302.

Connection Protocol: As set out above, each node connecting to the layered network 300 may connect according to a connection protocol. That is, the connecting node must obey the rules of the connection protocol. The connecting node may only form connections that are allowed by the connection protocol. No other connections may be formed. In examples, the connecting node may be a core node 301, a second node 302 or an outer node 303. In some examples, each node of the LN 300 must obey the connection protocol. In other examples, only nodes that are connecting to the LN 300 for the first time, or are re-joining the LN 300, must obey the connection protocol. FIGS. 3 to 6 illustrate example LNs 300, 400, 500, 600 that are established according to the connection protocol.

Note that, physically speaking, each of the nodes of the LN 300 may in some examples be connected or capable of connecting to one another at some other level, e.g. via the internet. The connection protocol imposes restrictions on what connections can be formed at the level of the overlay network, i.e. at the level of the layered network, some connections do not exist or are not allowed. Each connecting node of the LN 300 is configured to operate in accordance with an overlay-level protocol (which comprises the connection protocol) of the LN 300 which determines what connections the nodes can and can't form at the overlay-level. In other words a connection is an allowed communication channel which two nodes are configured to be allowed to form by their protocol. If a node has a connection with another node, then it can commutate with that node without hopping via another node of the layered network, but if it does not then it cannot and may only communicate by hopping via one or more other nodes that do have connections between them.

The connection protocol requires that the connecting node connects to at least one node of a preceding (more inner) layer and to at least one core node, with the exception that a core node may, in some examples, be the innermost layer and so cannot connect to a preceding layer. In examples where the connecting node is a second node, these two requirements are equivalent. If the connecting node is an outer node of a first outer layer, the connecting node connects to at least a second node 302 and a core node 301.

The connection protocol may require that the connecting node connects to more than one core node. The connection protocol may further require that the connection node connects to more than one but not all of the core nodes, e.g. all but one core node. The connecting node may be a second node that must connect to two or more core nodes. That is, some or all of the second nodes must connect to two or more core nodes (and in some examples, not all of the core nodes).

The connection protocol may require that the connecting node connects to one or more second nodes. If the connecting node is a second node, this means the connecting (second) node must connect to one or more different second nodes. If the connecting node is an outer node, the connecting (outer) node must connect to one or more second nodes. The connecting outer node may be an outer node of the first outer layer, or an outer node of a second layer, and so on.

The connection protocol may require that an outer node that is connected to a node of a preceding layer, must connect to some or all of the core node(s) that the node of the preceding layer is connected to (referred to above as "core ancestors"). For example, an outer node may be connected to a second node. In that case, the outer node must also connect to the core node(s) that the second node is connected to. If the outer node is connected to more than one second node, the connection protocol may require that the outer node must connect to the core node(s) that each of the second nodes are connected to. As another example, an outer node of a second outer layer may be connected to an outer node of a first outer layer. In that example, the connection protocol requires that the outer node of the second outer layer must connect to the core node(s) that the outer node of the first outer layer is connected to.

The connection protocol may require that an outer node connects to one or more (e.g. two) outer nodes of the same outer layer. The connection protocol may require that each outer node connects to one or more outer nodes of the same layer. Alternatively, some outer layers may include outer nodes that form one or more same layer connections, and some outer layers may include outer nodes that do not form one or more same layer connections. The connection protocol may require that each outer node of the same outer layer must connect to the same number of different outer nodes of that layer. For example, each outer node of the first outer layer may be required to connect to two outer nodes. Each outer node of the second pouter layer may be required to connect to three outer nodes. That is, the number of outer nodes of the same layer that an outer node is connected to may vary between outer layers.

In some embodiments, an outer node of an $i^{th}$ outer layer (e.g. a third outer layer) may be connected to an outer node of a preceding $(i-1)^{th}$ layer (e.g. a second outer layer). The connection protocol may require that an outer node (e.g. all outer nodes) of a successive $(i+1)^{th}$ outer layer must connect to each node of the $(i-1)^{th}$ layer that the outer node of the $i^{th}$ outer layer is connected to. For instance the outer node 305 of the fifth layer in the LN 500 of FIG. 5 is connected to the outer node 304 of the fourth layer and to the outer node 303 of the third layer. In some examples, the connection protocol may require that the outer node of the $(i+1)^{th}$ must connect to each outer node of each preceding layer that the outer node of the $i^{th}$ outer layer is connected to.

In embodiments where some or all of the nodes of the LN 300 are associated with digital certificates, the connection protocol may require that the connecting node must only connect to nodes that are associated with nodes that are associated with a respective digital certificate. In some embodiments, the connection protocol may require that the connecting node (e.g. an outer node) must only connect to a respective node (e.g. a second node) if the digital certificate associated with the respective node has been issued by a node (e.g. a core node) of a layer preceding the respective node, or in some examples, a node (e.g. a different second node) of the same layer of the respective node.

In some embodiments, the connection protocol may require that the connecting node can only connect to nodes that have issued the connection node with a digital certificate. That is, connecting to a node comprises receiving a digital certificate from that node.

The connection protocol enables the construction of a BLN. Like a Mandala network, a BLN is built up in layers. Unlike a Mandala network, the first layer may form an incomplete graph (e.g. a near-complete graph). Other differences between a BLN and a Mandala network are that, in a BLN, nodes in each successive layer may have different degrees, nodes may be connected to more than one node in the central layer, and/or the degree of nodes may differ between layers.

Preferably, for all nodes outside the central core:

(i) Each node is connected to m out of $n_1$ nodes in the central core.

(ii) Each node is connected to a node in every layer, where g is the total number of layers.

(iii) Each node is a member of exactly one community. There are at most $n_2$ communities, where $n_2$ is the number of nodes of the second layer.

(iv) Each node is connected to every other node by at most 3 hops. This is referred to as the diameter of the graph.

In a BLN, a "community" is defined as the set of nodes that share exactly the same set of core ancestors. FIG. 6 shows a BLN with network $n_1=6$, m=3 and g=4, with the nodes of two distinct communities drawn: a black node community and a white node community. The white node community comprises nodes which are all connected to three nodes on the LHS of the central core, while the black node community comprises nodes which are all connected to the three nodes on the RHS of the central core.

A characteristic of Mandala networks is that all nodes outside of the core layer (i=1) are connected to exactly one core ancestor (i.e. $c_i=1$ everywhere). This heavily contributes to the emergent properties of Mandala networks:

Having a mean shortest path length that asymptotes to a constant as the network size ($N=\Sigma_i n_i$) increases.

Becoming highly sparse as the network size ($N=\Sigma_i n_i$) increases.

Robust against random node failures.

A characteristic of a BLN is that all non-core nodes connect to at least one ancestor. However, the BLN definition accommodates non-core nodes having up to m connections to core ancestors (i.e. $1\leq c_i\leq m$ everywhere). The reason for the generalisation from $c_i=1$ to $1\leq c_i\leq m$ throughout a BLN can be understood as an artefact of the blockchain protocol. The protocol that defines a blockchain system relies on a probabilistic security model. In essence, this means that any participant (node) in a BLN with a vested interest in an event being recorded on the blockchain 150 must take into account the probabilistic security model by connecting to a minimum fraction f of network hashing power, where 100% of total hashing power is distributed amongst the nodes in the core layer of the BLN. Assuming that the core layer exhibits a uniform equilibrium distribution of hash power amongst its $n_1$ core nodes, then the minimum fraction of nodes is:

$$f = m/n_1$$

The blockchain protocol indicates that the lower bound for the minimum fraction is f=0.51, but the network participants of a BLN at scale may demand a higher fraction (e.g. f=0.67) than this for increased resilience (e.g. to double-spending). A BLN may be characterised by the choice of the parameter m, as this dictates the probabilistic security of operations for participants within the BLN, which will depend on the particular use case of needs of the BLN in question.

Nodes in the second layer $L_2$, being closest to the core, are most strongly dependent on the probabilistic security model of the blockchain protocol, and this dependency may decrease in layers approaching $L_g$. The connection protocol may require nodes in $L_2$ to connect to exactly $c_2=m$ core ancestors, while nodes in all successive layers i>2 may connect to anywhere in the range $1<<c_i\leq m$ of core ancestors. In some examples, nodes is all successive layers must connect to m core ancestors.

Nodes outside the central core of a BLN may have an ‘SPV-like’ connection to the core. This means that they can do the following.

a) Send a transaction to a core node b) Ask a core node if a transaction has been accepted in its mempool/candidate block c) Ask for the Merkle proof of a transaction that has been mined in a block d) Ask for an up-to-date list of block headers These simple, targeted requests are designed to put as little burden on the core nodes 301 as possible whilst allowing for the widest possible range of scalable solutions to be built on top using a BLN. Many use-cases will require no more that the type of connection described above. In some examples, the second nodes 302 and/or outer nodes 303 are configured such that they can only perform actions a) to d) above. However, other solutions, typically enterprise level, may require the core to actively serve them more data, such as transactions that satisfy specific criteria. Therefore actions a) to d) are a minimum requirement for a BLN but additional data transfer between those nodes and the core is also possible in some examples.

For nodes operating smart contracts, some may only need SPV-like actions a) to d), whilst others may require agreements put it place to receive more data from core nodes.

In some BLNs, users may operate nodes of layer 3 or higher, and a smart contract may be operated by nodes of layer 2 or higher. Users cannot practically ‘listen’ to the blockchain for a transaction with a particular output address on a continual basis as to do so would require constant monitoring of the blockchain 150 for transactions including the particular address. Given the number of transactions that can be transmitted to the blockchain per period of time is continuing to increase, such constant monitoring is not practical for an end user. Although it is common amongst the wallet architectural of some blockchains to constantly monitor the blockchain, it is not a scalable solution given that both the number of transactions submitted to the blockchain per period of time, and the number of users of the blockchain, are expected to increase dramatically in the future. Consider the following example: Alice would like to pay Bob. She creates a transaction for the desired amount with an output address that she knows belongs to Bob. Alice then submits this transaction to the mining network, and not directly to Bob. In order for Bob to know that the transaction has been accepted he must ‘listen’ to the blockchain to see if and when a transaction with his output address has appeared on the network. He must ask a mining node to do this on his behalf. This means that a mining node has to keep a record of Bob’s address and check whether every transaction it receives matches this address. Note that there is no economic incentive for a miner to do this. Assuming that a miner must process a million transactions per second and must check whether they match a million addresses shows that this quickly becomes unrealistic.

Instead, in a BLN, Alice may be directly connected to Bob and can send him the transaction directly. Bob can then send the transaction to miners in the core and at the same time ask if they accept the transaction as valid. Miners are incentivised to accept the transaction as it contains their fee, and they are incentivised to confirm whether they have accepted the transaction so that they lower the risk of constructing a block that will be orphaned. In order to make the system even more secure, Alice may send Bob the Merkle proofs of the inputs to her transactions. Bob may check these Merkle proofs as he has a copy of the block headers. This ensures Bob that Alice’s inputs were part of the blockchain 150 at one point, and if she has spent them already then Bob will have proof of the double spend as he has received signatures from Alice in the transaction that she has given him. Note that Bob may be a smart contract (second node) and Alice may be a user (outer node) who would like to interact with that smart contract. If the smart contract is ‘light’ in the sense that the smart contract operator has not made any specific agreement with a mining node to facilitate the processing of the smart contract, then it too cannot rely on listening to the blockchain 150 in order to receive a transaction that triggers a change in state. Alice must send such a transaction directly to the smart contract.

A service provider may operate a node in layer 2 or higher. The case of a service provider is different from that of a user or lightweight smart contract. A service provider may have a commercial agreement with a core mining node, or collection of core nodes, who then propagate a certain subset of transactions to the service provider nodes. Such transactions should be easily identifiable and satisfy specific criteria, for example:

- OP_RETURN data with a specific protocol flag. For example, the Meta net protocol, the Tokenized protocol, or a digital certificate protocol.
- Output addresses matching a small, specific set. For example, enterprise-level smart contracts or address whitelists/blacklists.
- A secondary consensus ruleset indicated by an OP_VER control branch.

In addition, transactions sent to the core that follow these rules, or are in other ways identified as part of the community engaged in the service-level agreement, may have lower (or even zero) transaction fees. The shortfall may be made up by a higher transaction volume or by revenue in fiat from the service-level agreement.

All nodes of the BLN 300 may be associated with a semi-permanent public key associated with their identity. This public key can allow for secure communication and provide a link to public keys used in blockchain transactions, either through a deterministic derivation of the identity key, or by signing or encrypting the transaction keys using the identity key.

Two ways of identifying mining core nodes are:

1) Miner ID. Miners may elect to identify themselves by adding their identity key to the input of the coinbase transaction in each block that they mine.
2) Network analysis. Some miners choose to remain anonymous. However, it is still possible to identify which nodes are constructing blocks by analysis of the network, for example by looking at where the new blocks originate from.

It is important that nodes of a BLN are able to identify both types of miners so that they can poll as many miners as possible as to whether their transactions have been accepted. Core nodes that have a Miner ID are able to issue digital certificates to layer 2 nodes. This may be because they have a service level agreement with these nodes, or it may be because these nodes have requested a certificate for a fee. In this sense core nodes can act as a Certificate Authority (CA).

With or without a certificate from a core node, a layer 2 node may seek an external CA to issue them a digital certificate. Therefore, each layer 2 node may have at least one digital certificate attesting to their identity. They may issue certificates to other nodes in layer 2 thereby creating a web of trust between them. Nodes in layer 2 may issue certificates to nodes in layer 3, and nodes in layer 3 may issue certificates to nodes in layer 4, and so on, creating a hierarchy of certificates referred to as a Public Key Infrastructure (PKI).

In fact, such a PKI can be used not just for the identification of nodes in a BLN, but ensuring that the correct BLN structure is adhered to. For example, if a layer 3 node issues certificates to too many layer 4 nodes, or does not ensure that they have the appropriate connections to others nodes in the system, then the certificate of the layer 3 node may be revoked. These certificates themselves may be stored on the blockchain 150. This makes the PKI transparent and easily auditable.

Ordering and Timestamping

There may be a number of applications that can be implemented using a blockchain where the order of the application data matters. To address this, according to embodiments of the present disclosure, one or more nodes of a network may be configured to act as an attestation service to arbitrate between different items of data submitted to the service in order to determine a definitive order of the data items, and then have that order recorded immutably on a blockchain.

The attestation service is implemented at one or more attestation nodes. In embodiments these are nodes of an overlay network overlaid on an underlying infrastructure network such as the Internet. However it is not excluded that alternatively they could be infrastructure nodes of a network in their own right, e.g. a private network within an organization. Either way, the one or more attestation nodes are arranged to receive items of data from one or more client nodes, to form transactions recording the order of the received data items, and to forward these transactions on to one or more core nodes for recordal on a blockchain 150. The core nodes are nodes 104 of the blockchain network 106. They may comprise mining nodes 104M, storage nodes 104S, or a combination thereof. In embodiments each of the core nodes is a mining node 104M and/or storage node 104S (e.g. full copy node).

Each of the client nodes may be an end-user node, comprising the computer equipment of a user of the service. This could be an individual user or an organization such as a company, academic institution, or government institution, etc. Hence each client node may comprise one or more user terminals and/or a server comprising one or more server units at one or more sites. Each client node comprises memory comprising one or more memory units, and processing apparatus comprising one or more processing units. These may for example take any of the forms of memory medium and/processor as those discussed previously in relation to other network elements or user equipment. The memory stores client software arranged to run on the processing apparatus, wherein the client software is configured so as when run to operate the node as a client of the attestation service provided by the attestation node(s) in accordance with any of the following embodiments or similar. Optionally, one or more of the transmitting end-user nodes may comprise the user equipment 103 of a user 102 of the blockchain network 106, and the client software may comprise a blockchain wallet application 105 or the like. However the attestation service may be arranged to formulate at least some transactions on behalf of such end-users, rather than all such transactions necessarily being formulated at the wallet 105 of the user.

The attestation nodes are arranged to provide an attestation service mediating between the client nodes and the core nodes. Each attestation node may take the form of a server comprising one or more physical server units. Each such node comprises memory comprising one or more memory units and processing apparatus comprising one or more processing units. These may for example take any of the forms of memory medium and/processor as those discussed previously in relation to other network elements. The memory stores attestation service software arranged to run on the processing apparatus of the attestation node. This software is configured so as when run to provide an attestation service that operates in accordance with any of the embodiments described below or similar. In embodiments, the identity of each attestation node may be certified by a certificate authority, to enable the client nodes, core nodes and/or other attestation service nodes to verify the identity of the attestation node. The identity of each client node may be certified by a certificate authority, to enable the attestation service nodes, core nodes and/or other client nodes to verify the identity of the client node. Interaction between such nodes for the purpose of providing or using the attestation service may be conditional on the verification. Alternatively or additionally, node versioning may be used as an alternative mechanism for node identification in an overlay network.

Figure 7:
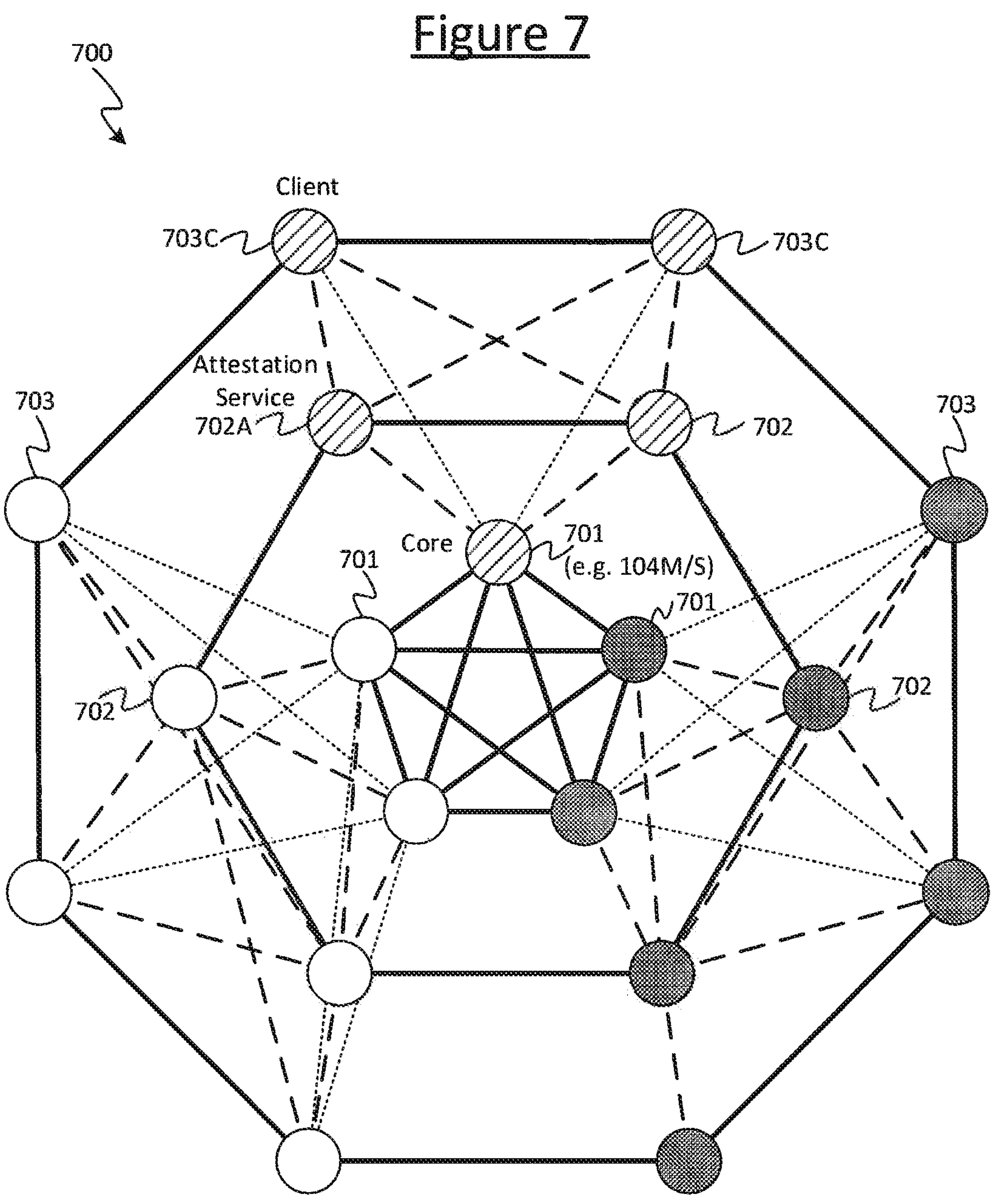
FIG. 7 schematically illustrates an example attestation service implemented in a layered network.

In embodiments the above arrangement may be implemented in the form a layered network 700, such as of the type described in relation to FIGS. 3 to 6, and as also illustrated in FIG. 7 by way of example. That is, the layered network comprises: a core network comprising the core nodes 701; at least one intermediate layer around the core, each intermediate layer comprising one or more intermediate layer nodes 702; and at least one outer layer around the outermost of the intermediate layers, each outer layer comprising one or more outer layer nodes 703. Note that the term "outer" in "outer layer" here does not in itself necessarily limit to the outermost layer of the layered network 700 as a whole, though that is one possibility. In embodiments the layered network 700 of FIG. 7 may be the layered network 300 of FIG. 3, in which case the outer layer nodes of FIG. 7 are the third layer nodes of FIG. 3 or 4, the intermediate layer nodes 702 of FIG. 7 are the second layer nodes 302 of FIG. 3 or 4, and the core nodes 701 of FIG. 7 may be the core nodes 301 of FIG. 3 or 4.

As discussed in relation to FIGS. 3 to 6, the layered network 700 may be an overlay network overlaid on an underlying physical or infrastructure network such as the Internet. In such embodiments the nodes 701, 702, 703 are configured to form connections between one another at the overlay network level. That is, the nodes 701, 702, 703 of the layered network are configured to obey an overlay network protocol which specifies what connections they can and cannot form with other nodes 701, 702, 703 of the layered network. Hence, although all the nodes may be physically capable of connecting to one another via the underlying infrastructure (e.g. the internet), when they are participating as nodes 701, 702, 703 of the layered network, operating in accordance with the relevant overlay network protocol of the layered network 700, then the connections between such nodes 701, 702, 703 may be more limited. A connection between two nodes 701/702/703 of the layered network 700 means those nodes can communicate directly, which in this context means without having to perform a hop via another node 701/702/703 of the layered network 700. In the context of an overlay network, a "connection" means a connection (i.e. edge) at the level of the overlay network (i.e. the level of the overlay network protocol of the layered network).

Each intermediate layer node 702 is connected to at least one core node 701 (blockchain network node 104) in the core network. The core network comprises at least part of the blockchain network 106. In embodiments the core network, in itself, may be a complete network.

In some cases, some of the intermediate layer nodes 702 and/or outer layer nodes 703 may comprise periphery nodes 104 of the block chain network 106, e.g. nodes other than mining nodes 104M and/or storage nodes 104S such as forwarding nodes 104F. Alternatively, they may comprise nodes that do not have any role in the blockchain network 106 (mining, storage or forwarding) other than as clients of the blockchain network 106.

Each outer layer node 703 is connected to at least one of the intermediate layer nodes in at least one intermediate layer. In embodiments each outer layer node 703 also has at least one connection to at least one core node 701 (i.e. to the blockchain network 106). In some such embodiments, one or more of the outer layer nodes 703 each have connections to more than one—but not all—of the core nodes 701. In embodiments the layered network 700 as a whole may be a non-complete network, i.e. not every node 701, 702, 703 has a connection to every other at the overlay network level. In embodiments each node within a given layer may be connected to at least one other node in the same layer. E.g. each node 702 in an intermediate layer may be connected to one or more others in the same intermediate layer, and/or each node 703 in an outer layer may be connected to one or more others in the same outer layer. In embodiments connections may also be formed between different intermediate layer nodes 702 in different intermediate layers, and/or different outer layer nodes 703 in different outer layers.

In embodiments, the layered network 700 may be configured in accordance with any of the protocol rules or structural features described in relation to FIGS. 3 to 6; where each intermediate layer of intermediate layer nodes 702 is a layer between the core and the outermost layer, and each outer layer of outer nodes 703 is a layer outside of the second layer (with the intermediate layer(s) being between the core and the outer layer(s)).

Embodiments below will be exemplified in the context of a layered network, but it will be appreciated that this is not limiting, and more generally the attesting node(s) could be any node of any type of overlay network which mediate between one or more client nodes and one or more core nodes 104 of the blockchain network 106.

In the implementation in a layered network 700, at least one of the intermediate nodes 702 in at least one intermediate layer takes the role of an attestation node 702A providing the attestation service. At least one of the outer nodes 703 in the outer layer in at least one outer layer is a client node 703C of the attestation service provided by the attestation node(s) 702A. Each core node 701 is one of the nodes 104 of the blockchain network 106, preferably a miner 104M and/or storage node 104S (e.g. full-copy node). Only two client nodes 703C and two attestation nodes 702A are shown in FIG. 7 for simplicity of illustration, but it will be appreciated that there may be more. In embodiments, the client nodes 703C and attestation nodes 702A may be part of the same community as one another.

The client nodes 703C are clients at least in that they are clients of the attestation service. In embodiments the client software run on one or more of the client nodes 703C may be further configured to operate its node 703C as a client of one or more additional services provided by one or more second layer nodes 702, e.g. a database service or smart-contract service. And/or, it may be configured to operate its node 703C as a client of one or more core nodes 701 (e.g. 104M, 104S) of the blockchain network 106, such as to be able to query the blockchain 150.

Also the fact that the client nodes 703C are described as clients of the attestation service (and optionally one or more other services) does not exclude the possibility that these nodes may themselves also be servers of one or more further services to one or more further entities (not shown). E.g. a client node 703C could comprise computer equipment of a company who provides online services to customers. "End-user" herein means an end-user of a particular service in question and does not necessarily limit to an individual consumer at the end of a commercial supply chain (though that is certainly one possibility as well).

The following describes a method in which an ordering service entity 702A may use the blockchain 150 to record the ordering and time in which data elements were received from one or more client nodes 703C. Optionally the ordering service may also perform timestamping.

The method is first described for a single trusted order-attestation node 702A. This may be modelled as a single intermediate layer (e.g. second layer) node in a layered network 700 with a core of blockchain network nodes 104/701. The users of this service will then be the users of outer layer (e.g. third layer) nodes 703C which are directly connected to the service 702A and optionally also the blockchain 150 (by means of a connection to at least one core node 701 in the core).

When data elements are received from client nodes 703C in the outer layer, the intermediate layer timestamping service 702A will gather them together in such a way that an order is established. When a certain time period has passed, for example 0.1 seconds, this ordered list of data elements is encapsulated in a transaction and sent to the blockchain 150 via the core 701, and thus recorded immutably. If a timestamp is added to the records then this also records time as well as order.

An example application is to define a definitive order amongst updates to entries in a database or such like. In this case each data item received from a client node 703C may represent a respective change of state (i.e. update) to an entry in the database. However such updates are not necessarily commutative—i.e. order matters. For example, if there are two requests to perform a non-commutative operation of a data element, e.g. matrix multiplication from the left, then the order is important. In another example, one request may be to delete a file and the other to read a file. Again, the order these requests are applied makes a difference to the result.

Another example application is to implement smart contracts in an output-based (e.g. UTXO-based) blockchain model. UTXO-based transactions or the like do not inherently support smart contracts in the same way that transactions of an account-based model do, so the smart contract functionality needs to be layered on top of the basic transaction model if smart contracts are to be implemented in an output-based model such as a UTXO-based model. In this case the data items to be recorded on the blockchain 150 may again represent changes in state, e.g. changes in ownership or such like. Again, the order matters, e.g. as it may affect whether an attempted assignment of ownership is valid.

Another example application is an ordering and timestamping of digital certificates from a certificate authority (CA). Digital certificates are used to approve access rights or other electronic permissions and are used, for example, in the SSL/TLS and HTTPS security that underpins the internet. In 2011 a Dutch CA was compromised by an attacker thought to be operating from Iran. False certificates were issued for high-profile domains, and log files were tampered with on the CA's servers. Had these log files been stored on the blockchain, using an ordering and timestamping service as described below, it would not have been possible to change the log files due to the security provided by proof-of-work. It is worth noting that private keys in the company's HSMs were compromised in the attack. This highlights the fact that one cannot always appeal solely to classical cryptographic protocols to ensure information security, and it may be beneficial also to rely on other mechanisms, such as proof-of-work, to make such attacks prohibitively onerous.

In operation, the attestation node 702A is arranged to receive a plurality of data items from one or more client nodes 703C, over the overlay network connections between the intermediate and outer layers. The data items may be labelled herein D by way of arbitrary terminology. The plurality of data items in question may be received from the same client node 703C or different client nodes 703C, or some from the same client node 703C and some from different client nodes 703C. They may be received directly via a connection between the client node 703C and the attestation node 702A, or may be forwarded via one or more other nodes of the layered network in between (i.e. may be received via more than one hop between the transmitting client node 703C and attesting node 702A).

The attestation node 702A is configured to determine an order of the plurality of data items D, thus determining a sequence of the plurality of data items. In embodiments the determined order is the order of receipt of the data items at the attestation node 702A. However it is not excluded that some other arbitration rule could be applied. For example if the data items are stamped with a time of transmission or creation by the client node(s) 703C that transmitted them, and the attestation node 702A trusts these client nodes, then the order could be the reported time of transmission or creation rather than the time of receipt. As another example the order could be dependent on a priority scheme that gives different weightings to different data items.

Whatever the determined order, the attestation node 702A attests to this order by creating a series of blockchain transactions 152 for recordal on the blockchain 150. The attesting node 702A generates a series of two or more such transactions, which may be labelled herein $Tx_0$, $Tx_1$, $Tx_2$ . . . by way of arbitrary terminology. The attestation node 702A includes an indication of a different set of one or more of the data items D in a payload of each successive one of the transactions Tx in the series. The payload may be comprised in an unspendable output of the respective transaction. Such an output may be made unspendable by means of an opcode that terminates the locking script of that output, e.g. OP_RETURN. However in other transaction protocols payloads may be included in other ways. The set of one or more data items indicated in each successive transaction comes after the set indicated in the transaction immediately preceding that transaction in the series of transactions, according to the order of data items determined by the attestation node 702A. I.e. the order of the transactions in the series matches the order of the sets in the determined sequence of data items.

The attestation node 702A creates, or otherwise determines, a corresponding series of public/private keypairs for the series of transactions:

$$P_1, P_2, P_3, \ldots$$

The attestation node 702A uses the private key of each keypair to sign the corresponding transaction in the series of transactions:

$$Tx_0 \to Tx_1 \to Tx_2 \to Tx_3 \to \cdots .$$

Figures 8, 9:
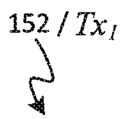
FIG. 8 is a schematic transaction diagram of an example transaction for recording an order of data items on a blockchain.
FIG. 9 schematically illustrates an example indexed list for recording an order of a set of data items within a transaction.

Transaction $Tx_1$ contains the signature of $P_1$ in the unlocking script in its input, and transaction $Tx_2$ contains the signature of $P_2$ etc. Each transaction also contains a payload, e.g. in an OP_RETURN field, that includes the indication of the set of one or more data items D attested to by the respective transaction. This payload is signed over by each signature (in embodiments employing the Script language, the appropriate SIGHASH flag may be used). The initial funding transaction $Tx_0$ is constructed such that it can be unlocked by a signature of $P_1$. It may have an outpoint 0 with a dust value. By way of example, $Tx_1$ may be constructed as shown in FIG. 8. All subsequent transactions have the same structure. I.e. $Tx_2$ contains a signature using P2 in an input pointing to $Tx_1$ to unlock $Tx_1$, and has a locking script in an output which can be unlocked by a signature of P3, etc. The signatures can be verified by the blockchain network 106 based on the corresponding public keys of the key pairs. The funding transaction $Tx_0$ may or may not include an indication of the first set of data item (the first set of data items in the sequence could be indicated in $Tx_0$ or $Tx_1$).

Note: the form shown in FIG. 8 ignores transactions fees for simplicity. This can be accounted for by adding another input and output to the transaction (e.g. administrated by attestation service).

The OP_RETURN statement contains a payload called $data_1$. This contains the data elements D, or an indication thereof, submitted by the users in an order attested to by the attestation service amongst the set attested to by $Tx_1$. (and similarly for $data_2$ in $Tx_2$, etc.). Since each transaction signs the hash of the previous transaction, this also implies an ordering of the payloads $data_1$, $data_2$, $data_3$ and so on.

A blockchain transaction cannot feasibly be double spent once it is accepted by the blockchain network 106. It also acts as a form of publishing for the order attested to the attestation service provided by the attesting node 702A. This gives confidence to a user of a client node 703 that the position in which their data element appears in order attested to by this attestation authority cannot be retrospectively altered. Once such a transaction is mined in a block 151 it becomes even more unlikely that the order will be altered as it is computationally expensive to replace an existing block.

In some embodiments the set indicated in each transaction $Tx_0$, $Tx_1$, $Tx_2$ . . . consists of only a single one of the data items D per transaction (i.e. each data payload indicates only a single respective D). Alternatively the set indicated in each such transaction may comprise multiple data items D per transaction (each data payload indicates a different respective set of multiple different data items D). In the latter case, the payload information also specifies the order of the data items D within the local set of the respective transaction. This may be achieved for example by means of an ordered list included in the payload (e.g. OP_RETURN output), and/or an index indicating the order mapped to the indication of each D. Examples are shown in FIGS. 9 to 11, to be discussed in more detail shortly.

When multiple data items D are indicated per transaction, some basis is required to determine which data items are to be gathered together per transaction. In principle any scheme could be used for dividing up the data items between transactions, but in embodiments this may be done based on regular time intervals. I.e. all data items D received by the attestation node 702A within a first instance of the regular time interval are included in a first transaction in the series, then all data items D received in the next instance of the regular time interval are indicated in the next transaction in the series, etc.

The exact timing of the interval between transactions may be configured by the implementation. For example, transactions may be submitted at intervals of 0.1 seconds.

The respective set of data items may be indicated in a transaction simply by including the data item(s) of that set explicitly ("in-the-clear") in the payload of the respective transaction Tx. Alternatively or additionally, they may be indicated in a transformed form such as a hash, encrypted form, or an r-puzzle. Examples will be discussed in more detail in relation to FIGS. 9 to 11. In the context of an ordering attestation service, as a minimum an "indication" of data items herein means some information enabling a querying node inspecting the transactions to verify the attested order of the data items. In some cases where the explicit values of the data items D are not included explicitly in the transactions, this may require that the querying node has predetermined knowledge of the values of the data items D, and is merely inspecting the transactions on-chain or in the mempools 154 of blockchain nodes 104 to confirm an expected order of those items.

In embodiments, the attestation node 702A may also include at least one timestamp in the payload of each transaction $Tx_0$, $Tx_1$, $Tx_2$ . . . in the series. The timestamp indicates a time at which the respective data item(s) were received at the attesting node 702A. In the case of a single data item D per transaction, this may simply be the time of receipt of that data item. In the case of multiple data items D per transaction Tx, each transaction payload could include a single timestamp indicating a time of arrival for the set (e.g. the time interval in which they were received), or an individual timestamp per data item D in the set.

When the attestation service submits a transaction containing a user's data to the blockchain 150, in some embodiments it will also send this transaction to the client node(s) 703 which submitted the data items D. This is possible since the user in an outer layer (e.g. layer 3) is directly connected to the attestation node 702A in an intermediate (e.g. layer 2). Since in embodiments the client node 703 is also directly connect to the blockchain mining nodes 104M and/or storage nodes 104S in the core, it may check independently that the transactions $Tx_0$, $Tx_1$, $Tx_2$ . . . have been accepted by the blockchain network 106. The client node 703A can thus query the mempools 154 of the miners 104M, and/or the actual blockchain 150 record on the storage nodes 104S, in order to confirm that the expected order has been attested to. Other third-party nodes may also verify this in a similar manner via any suitable connection the blockchain network 106. In some embodiments, the query by a client node 703A may be performed via a connection between the client node 703C and the core using only the SPV-like connectivity discussed previously in relation to FIGS. 3 to 6.

Optionally, the attestation service may also send the client node(s) 703C that submitted the data items a chain of transactions preceding the transaction containing their data. This is so that the users can be sure that there are not two competing chains of transactions with different orders that have been submitted to the blockchain by the service. The length of the chain of transactions should be appropriate for the level of trust required by the user. This trust may be outsourced: for example a certificate authority may certify the accuracy of the chain of transactions every hour.

In embodiments, client nodes 703C within a layer may also be connected to one another and can send each other (mined) transactions containing their and the corresponding Merkle proofs. Since in embodiments each outer layer (e.g. layer 3) node is independently connected to the blockchain 150, then they can verify that the Merkle proofs are correct.

This allows users in an outer layer (e.g. layer 3) to agree upon an ordering of the data with only a minimal amount of temporary trust in the timestamping service, before trust in the proof-of-work on the blockchain takes over.

The following will now explore the OP_RETURN payload $data_1$ in more detail. The goal is for the service to attest to an order in which the data elements $D_1$, $D_2$, $D_3$, . . . were received in the time interval. Note that the data elements may represent hash commits of the data relevant to each user. It may be up to the user's discretion whether they choose to publicise their data or instead to record a hash commit of their data.

There are a few different ways the set of data items D and their relative order can be indicated within a transaction Tx. The simplest is to just index each element and since the OP_RETURN is signed over then this is attested to by the timestamping service. However, there are smarter ways to do this that provide additional evidence of ordering and allow for generalisations to distributed timestamping services.

METHOD 1.1: HASH CHAIN. A unique index i is assigned to each data element $D_i$ and an entry $H_i$ in a hash chain is created. The value of $H_i$ is dependent on the data element and the previous element of the hash chain. This means that each element of the hash chain must have been created after the previous element, enforcing an order. An example of the hash chain is shown in the table of FIG. 9. This table would be included in the payload (data) of the transaction, optionally with or without the explicit D column being included in the transaction.

One advantage if the values of D are not explicitly included is that the hash may be smaller than D, and hence this requires fewer bits to be stored on chain. Also it means that the actual values of D do not need to be published if the user does not want to make them public. Either way, whether the D values are explicitly included or not, another advantage of the hash chain is that it makes the order harder to change. Say there are 1000 data items D per transaction by way of illustration. Then to re-order these data items would require 1000 hashes to be performed, which would be computationally onerous. Thus even if the attestation node 702A is not completely trusted, this gives the user additional confidence that the data items have not been re-ordered.

In some embodiments, an attestation of a timestamp $t_i$ of the receipt of each data element $D_i$ may also be included. One way to do this is to include a timestamp in the preimage of each element of the hash chain, e.g.:

$$H_1' = H(D_1 \| t_1) H_2' = H(D_2 \| t_2 \| H_1'), \text{ etc.}$$

In this case a column containing the time will also be added to the table of FIG. 9.

The OP_RETURN payload $data_1$ is made up of the table such as shown in FIG. 9. The column 'Data' may be omitted to save space or to keep the data elements private. Although note that in that case, the only way for someone to prove the order of the hash chain is for all data elements to be known.

Additional security may be provided by replacing the hash functions with an HMAC. An HMAC is described in RFC 2104 and introduces a secret symmetric key to the hashing procedure. This means that only those with the knowledge of the secret key may be able to prove the order of the data.

METHOD 1.2: HASH CHAIN WITH MERKLE TREE. This case is similar to the hash chain of FIG. 9, but instead of publishing the entire hash chain, it is turned into a Merkle tree and just the root is published. In this case each data item Din the set is modelled as a leaf of the Merkle tree, and the Merkle root is included as the indication in the transaction. Note that an index of the data is implied by the order in which it appears in the leaves of the Merkle tree. A Merkle proof could be provided later to a user to allow the user to check the presence of a data item and its position in the Merkle tree. This method saves space in the transactions as only 256 bits are required in the OP_RETURN payload for the Merkle root.

Additionally or alternatively, each data item may be indicated in the transaction by a corresponding merkle proof for that leaf. As will be familiar to a person skilled in the art, a Merkle tree allows one to prove that a given data item is a member of a set, given the merkle root and the merkle proof for the data item (which is the chain of hashes between the root and the leaf).

METHOD 2.1: CHAIN OF SIGNATURES. In this method, a new public key is created for each data element D, and that element is signed with the new public key. This is aligned with the requirements in the timestamping protocol outlined in RFC 3161.

Consider the sequence of public keys and signatures shown in FIG. 10. The idea is that each public key is generated based on the preceding data. Similar to the hash chain, each public key (and therefore signature) in the sequence can only be created with the knowledge of the previous public key in the sequence, thus enforcing an order.

In a variant of this method, the entries in the table could each be transactions in their own right.

METHOD 2.2: CHAIN OF r-PUZZLES. An R-puzzle is a recently disclosed form of challenge and proof. It is based in the r-part of an ECDSA signature (S, R), and provides a way to prove knowledge of a secret without revealing that secret.

An ECDSA (elliptic curve digital signature algorithm) signature consists of the combination (S,R) where R is the x-coordinate of the public part of the ephemeral keypair. It is possible to use the same public key for each signature but chain together the ephemeral keys. This would give the sequence shown in FIG. 11. This may be included in the transaction payload (data) either as an alternative to, or in addition to, any of the above methods.

Here $R_1$ is a random ephemeral key and $\langle S_1, R_{1i} \rangle (H(D_i))$ means the data H $(D_i)$ signed with $P_1$ using ephemeral key $R_{1i}$.

In general any of methods 1.1, 1.2, 2.2 and/or 2.2, and/or others, may be used individually or in conjunction to indicate the order amongst a set of data items D in the payload (data) of a transaction.

DISTRIBUTED CASE: The above has been described in a scenario where the order-attestation service is provided by an individual node 702A. It is also possible to provide such a service through multiple attestation nodes 702A.

Consider for example a situation with a distributed attestation service that uses a layered network 700 to achieve consensus. In this case more than one of the intermediate layer nodes 702 (e.g. layer 2 nodes) in FIG. 7 will take the role of attestation nodes.

Assume that the majority of attestation nodes 702A act honestly and would like to achieve a consensus for ordering and timestamping of the data propagated around a community (as defined earlier) that is made up of the attestation service nodes 702A and the users 703C. Assume that there are N independent attestation service nodes 703A that are connected to the same subset of m core mining nodes 701 and therefore define a community of the layered network 700. The fact that there are multiple intermediate layer (e.g. layer 2) attestation nodes 702A allows for many users in the outer layer(s) (e.g. layer 3) to connect to a node 702 in an intermediate layer (e.g. layer 2) without the load being too high (too many connections) for the intermediate layer nodes.

The issue to address then, in such as distributed case, is how the intermediate-layer attestation nodes 702A (e.g. layer 2 nodes) can agree to a consensus in the ordering of, for example, two data items $D_1$, $D_2$ submitted by two users even if they arrive in a different order at one attestation node 702A compared to another.

One method for addressing this is to use threshold signatures, i.e. where at least M different signatures (M>1) are needed to unlock a transaction Tx rather than just one, as discussed previously. Consider an M-of-N threshold signature system as described applied to the attestation service nodes 702A. This means that there are N participating nodes with private keyshares $\alpha_1, \alpha_2, \ldots, \alpha_N$. Any subgroup of M participants can produce signature shares that combine to give a signature of a message that will unlock the preceding transaction in the series.

Suppose one of the attestation service nodes 702A produces a candidate transaction $Tx_1$ containing the OP_REUTRN payload $data_1$ that is an ordered list of all data elements D it has received in the chosen time period. This node may broadcast the candidate transaction to all other attestation service nodes 702A (or at least some of them) and ask for their signature shares to sign the transaction. If they receive at least M signature shares (including their own) then the transaction may be submitted to the blockchain network 106 and mined into a block 151. This ensures that an ordering of the data elements is agreed by at least M-of-N timestamping services in the distributed network.

How is a single attestation node 702A chosen to create at transaction? The above has assumed that there is just one attestation service node 702A that has created a candidate transaction $Tx_1$ and that the other attestation nodes 702A are OK with this. But what about the next candidate transaction? There are at least two options: (i) there is always one privileged attestation node 702A that creates candidate transactions, or (ii) after each transaction is created then one of the attestation nodes 702A is chosen at random to be the next node to create the next transaction. This could be a random sequence determined in advance, or it could be a deterministically random choice based a seed relating to the transaction $Tx_1$ that has just been submitted. For example, the seed may be taken to be the $Tx_1$. Other distributed arbitration algorithms for distributed computing may also be possible.

Smart Contracts

Figure 12:
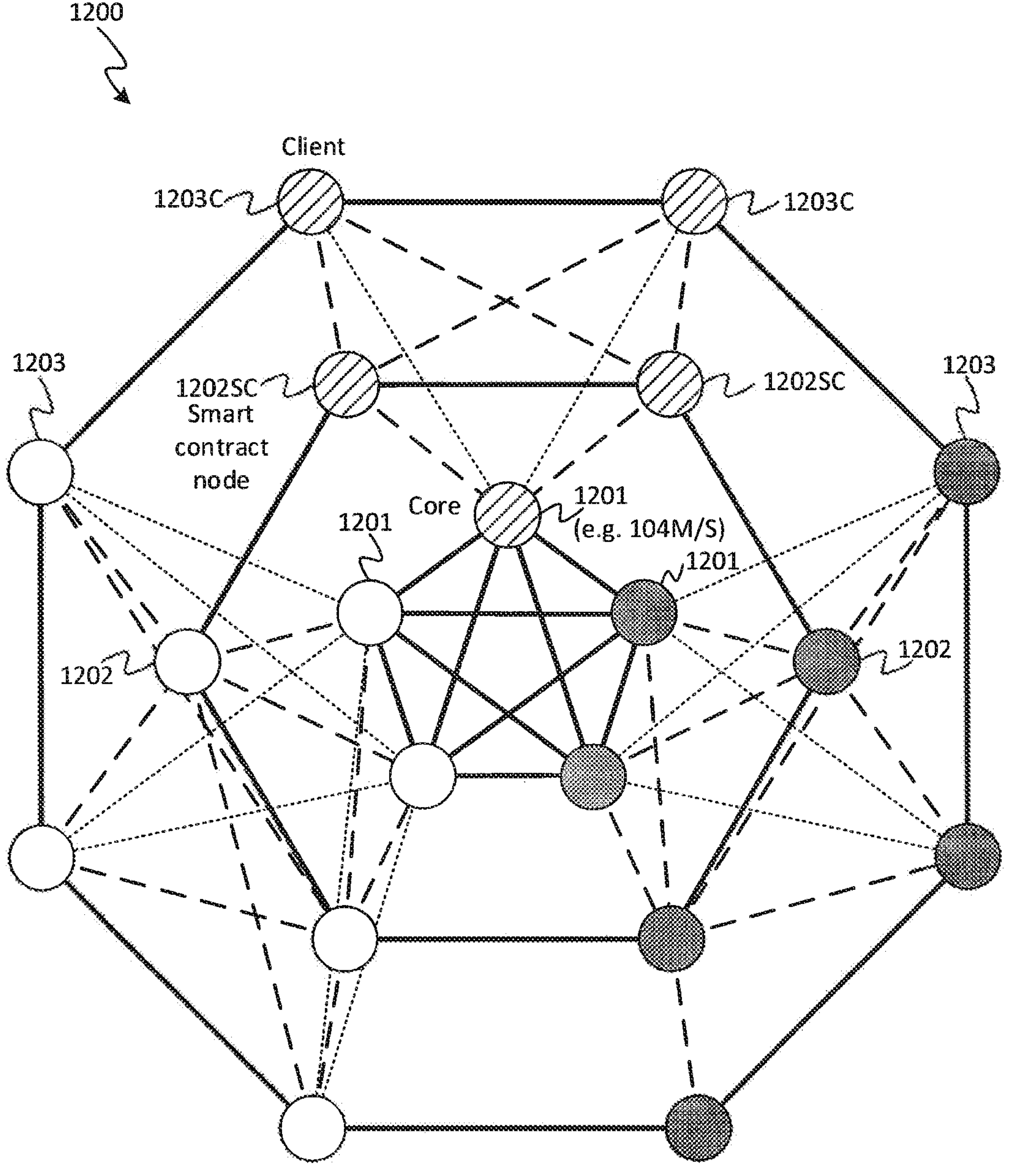
FIG. 12 schematically illustrates a system of smart contract nodes implemented in a layer of a layered network.

FIG. 12 shows an example of a system of smart contracts implemented in a layered network 1200 in accordance with embodiments disclosed herein.

The layered network 1200 comprises: a core network comprising one or more core nodes 1201; at least one intermediate layer around the core, each intermediate layer comprising one or more intermediate layer nodes 1202; and at least one outer layer around the outermost of the intermediate layers, each outer layer comprising one or more outer layer nodes 1203. Again the term "outer" in "outer layer" here does not necessarily limit to outermost, though that is one possibility. The layered network 1200 may be an overlay network overlaid on an underlying physical or infrastructure network such as the Internet, or alternatively may be a standalone network such as private network within an organization.

The core nodes 1201 are nodes 104 of the blockchain network 106. They may comprise mining nodes 104M, storage nodes 104S, or a combination thereof. In embodiments each of the core nodes is a mining node 104M and/or storage node 104S (e.g. full copy node).

In some cases, some of the intermediate layer nodes 1202 and/or outer layer nodes 1203 may comprise periphery nodes 104 of the blockchain network 106, e.g. nodes other than mining nodes 104M and/or storage nodes 104S such as forwarding nodes 104F. Alternatively, they may comprise nodes that do not have any role in the blockchain network 106 (mining, storage or forwarding) other than as a client of the blockchain network 106.

The intermediate nodes 1202 comprise a plurality of smart contract nodes 1202SC across one or more intermediate layers of the layered network 1200. Between them the smart contract nodes 1202SC provide a smart contract service to the client nodes 1203C. Each of these smart contract nodes 1202SC is configured to maintain a record of a state of one or more smart contracts. In embodiments states are propagated among smart contract nodes 1202SC, such that the states of at least some smart contracts are duplicated across more than one smart contract node 1202SC. In some cases each smart contract node 1202SC could store a copy of the state of every smart contract in the system; but in other embodiments each smart contract node 1202SC stores the state of only one or some of the smart contracts, and each contract's state may be replicated over only some but not all of the smart contract nodes 1202SC.

Each smart contract node 1202SC may take the form of a server comprising one or more physical server units. Each such node comprises memory comprising one or more memory units and processing apparatus comprising one or more processing units. These may for example take any of the forms of memory medium and/processor as those discussed previously in relation to other network elements. As well as the database entries themselves, the memory stores database software arranged to run on the processing apparatus of the attestation node. This software is configured so as when run to provide a database service that operates in accordance with any of the embodiments described below or similar.

In embodiments, the identity of each smart contract node 1202SC may be certified by a certificate authority, to enable the client node(s) 1203C, core nodes 1201 and/or other smart contract nodes 1202SC or other intermediate layer nodes (such as attestations service nodes 702A or smart contract nodes) to verify the identity of the smart contract node 1202SC. Interaction between such nodes may be conditional on the verification. E.g. a client node 1203C may only send messages to a smart contract node 1202SC on condition of verifying its identity based on the certification. Alternatively or additionally, node versioning may be used as an alternative mechanism for node identification in an overlay network.

Each of the client nodes 1203C may be an end-user node, comprising the computer equipment of a user of the smart contract service. Again this could be an individual user or an organization such as a company, academic institution, or government institution, etc. Hence each client node may comprise one or more user terminals and/or a server comprising one or more server units at one or more sites. Each client node comprises memory comprising one or more memory units, and processing apparatus comprising one or more processing units. These may for example take any of the forms of memory medium and/processor as those discussed previously in relation to other network elements or user equipment. The memory stores client software arranged to run on the processing apparatus, wherein the client software is configured so as when run to operate the node as a client of the smart contract service provided by the smart contract node(s) 1202SC in accordance with any of the following embodiments or similar. Optionally, one or more of the transmitting end-user nodes may comprise the user equipment 103 of a user 102 of the blockchain network 106, and the client software may comprise a blockchain wallet application 105 or the like.

In embodiments, the identity of each client node 1203C may be certified by a certificate authority, to enable the smart contract node(s) 1202SC, other intermediate layer nodes (such as attestations service nodes 702A or smart contract nodes), core nodes 1201 and/or other client nodes 1203C or to verify the identity of the client node 1203C. Interaction between such nodes may be conditional on the verification. E.g. a smart contract node 1202SC may only accept messages from a client node 1203C on condition of verifying its identity based on the certification. Alternatively or additionally, node versioning may be used as an alternative mechanism for node identification in an overlay network.

In embodiments, the layered network 1200 may be configured in accordance with any of the protocol rules or structural features described in relation to FIGS. 3 to 6 and/or 7. The nodes 1201, 1202, 1203 are configured to form connections between one another, at the overlay network level in the case where the layered network 1200 is an overlay network overlaid on an underlying infrastructure network such as the Internet. That is, the nodes 1201, 1202, 1203 of the layered network are configured to obey an overlay network protocol which specifies what connections they can and cannot form with other nodes 1201, 1202, 1203 of the layered network.

For example, in embodiments each intermediate layer node 1202 is connected to at least one core node 1201 (blockchain network node 104) in the core network. The core network comprises at least part of the blockchain network 106. In embodiments the core network, in itself, may be a complete network. Each outer layer node 1203 may be connected to a least one of the intermediate layer nodes in at least one intermediate layer. In embodiments each outer layer node 1203 also has at least one connection to at least one core node 1201 (i.e. to the blockchain network). In some such embodiments, one or more of the outer layer nodes 1203 each have connections to more than one—but not all—of the core nodes 1201. In embodiments the layered network 1200 as a whole may be a non-complete network, i.e. not every node 1201, 1202, 1203 has a connection to every other at the overlay network level. In embodiments each node within a given layer may be connected to at least one other node in the same layer. E.g. each node 1202 in an intermediate layer may be connected to one or more others in the same intermediate layer, and/or each node 1203 in an outer layer may be connected to one or more others in the same outer layer. In embodiments connections may also be formed between different intermediate layer nodes 1202 in different intermediate layers, and/or different outer layer nodes 1203 in different outer layers.

A connection between two nodes 1201/1202/1203 of the layered network 1200 means those nodes can communicate directly, which in this context means without having to perform a hop via another node 1201/1202/1203 of the layered network 1200. In the context of an overlay network, a "connection" means a connection (i.e. edge) at the level of the overlay network (i.e. the level of the overlay network protocol of the layered network).

Only two client nodes 1203C and two smart contract nodes 1202SC are shown in FIG. 12 for simplicity of illustration, but it will be appreciated that there may be more. In embodiments, the client nodes 1203C and smart contract nodes 1202SC may be part of the same community as one another.

The client nodes 1203C are clients at least in that they are clients of the smart contract service. In embodiments the client software run on one or more of the client nodes 1203C may be further configured to operate its node 1203C as a client of one or more additional services provided by one or more second layer nodes 1202, e.g. an ordering attestation service or database service. And/or, it may be configured to operate its node 1203C as a client of one or more core nodes 1201 (e.g. 104M, 104S) of the blockchain network 106, such as to be able to query the blockchain 150. Also the fact that the client nodes 1203C are described as clients of the smart contract service (and optionally one or more other services) does not exclude the possibility that these nodes may themselves also be servers of one or more further services to one or more further entities (not shown). E.g. a client node 1203C could comprise computer equipment of a company who provides online services to customers over the web.

In some embodiments, the layered network 1200 of FIG. 12 may be the layered network 300 of FIG. 3 or 4. In this case the outer layer nodes 1203 of FIG. 12 are the third layer nodes 303 of FIG. 3 or 4, the intermediate layer nodes 1202 of FIG. 12 are the second layer nodes 302 of FIG. 3 or 4, and the core nodes 1201 of FIG. 12 are the core nodes 301 of FIG. 3 or 4.

In some embodiments the layered network 1200 of FIG. 12 may be the layered network 700 of FIG. 7, in which case the outer layer nodes 1203 of FIG. 12 are the outer layer nodes 703 of FIG. 7, the intermediate layer nodes 1202 of FIG. 12 are the intermediate layer nodes 702 of FIG. 7, and the core nodes 1201 of FIG. 12 are the core nodes 701 of FIG. 7. In such embodiments, the attestation service of the attestation nodes 702A may be integrated into some or all of the same intermediate layer nodes 702/1202 as the smart contract nodes 1202SC, and/or the attestation nodes 702A may comprise separate intermediate layer nodes 702/1202 in the same and/or different intermediate layers in the same and/or different communities.

In operation, one or more users of one or more client nodes 1203C determine the terms of a smart contract. This may be negotiated between users of two or more client nodes 1203C over one or more of the connections within one or more of the outer layers of the layered network 1200. Alternatively the terms may negotiated separately from the layered network 1200, e.g. in a phone call or in-person meeting.

Either way, one of the nodes 1202/1203 in the outer or intermediate layers formulates at least a first transaction 152 for recording a state of the smart contract on the blockchain 150. The state could comprise the full terms of the contract or just one or more parameters of the contracts, e.g. whether the contract is live or expired, or who is a current owner of a right represented by the contract.

In embodiments the first transaction is formulated at least in part by a client node 1203C, and sent to the core layer from the client node 1203C directly via one of the connections within the layered network 1200 between the client node 1203C and at least one of the core nodes 1201. In this case a separate step is required to inform at least one of the smart contract nodes 1202SC about a state of the smart contract. This could be done by sending a copy of the transaction to the smart contract node 1202SC, or sending a separate message (not in the form of a transaction) informing the smart contract node 1202SC of the relevant state of the smart contract. This could be conducted via one or more of the connections between the outer and intermediate layers of the layered network 1200. Another option is for the smart contract node 1202SC to inspect the transaction as recorded on the blockchain 150, or in a mempool 154 of a miner of the blockchain network 106, through one or more nodes 1201 (104) of the core layer. This inspection may be performed directly over a connection between the smart contract node 1202SC and one or more of the core nodes 1201 in the core layer, or alternatively it may be performed via more than one hop to the core.

In other embodiments, the first transaction is formulated at least in part by a client node 1203C, and sent to the smart contract node 1202SC to forward on to the core layer 1201 for recordal on the blockchain 150. In this case the smart contract node 1202SC knows about the state of the smart contract from having received the transaction from the client 1203C. The smart contract node 1202SC may receive the transaction from the client node 1203C directly over a connection within the layered network 1200 between the client 1203C and the smart contract nodes 1202SC. Alternatively it may be received indirectly via more than one hop within the layered network 1200. The smart contract node 1202SC may forward the transaction to the core layer directly over a connection within the layered network between the smart contract node 1202SC and one or more of the core nodes 1201, or indirectly via more than one hop.

In further possible embodiments, the first transaction may be formulated at least in part by the smart contract node 1202SC. In this case the smart contract node 1202SC may send the first transaction to the core layer to be recorded on the blockchain 150. It may send the first contract to the core directly over a connection within the layered network 1200 to one or more of the core nodes 1201. Alternatively the smart contract node 1202SC may send the first transaction indirectly to the core layer via more than one hop within the layered network 1200.

In some embodiments, one or more of the terms of the smart contract may be negotiated by exchanging a template version of the first transaction between two or more client nodes 1203C, and/or between one or more of the client nodes 1203C and the smart contract node 1202SC. This negotiation process may involve the respective parties adding their signatures to the transaction once they have received the template and approve the term(s) in question. Some examples will be discussed later. In some such embodiments the smart contract node 1202SC may determine the relevant state of the smart contract via the template used in the negotiations, even if it does not see the final version of the transaction before being recorded on chain.

By any of the above routes, the smart contract node 1202SC knows about the smart contract state which is also being stored on the blockchain 150. It can then record the state in a local record maintained at the smart contract node 1202SC as well. In some embodiments, the smart contract node 1202SC may also propagate the state to one or more others of the smart contract nodes 1202SC, which record the state in their own local records as well. Alternatively there may be only one smart contract node 1202SC, or there may be a plurality of smart contract nodes 1202SC in the network 1200 but each may operate independently (without propagating state between them).

Any node wishing to confirm the state of the smart contract can then check the state from either the smart contract node 1202SC, or the blockchain 150 through a core node 1201, or both.

For instance, in embodiments a client node 1203C may contact one of the smart contract nodes 1202SC to query the state of the smart contract without needing to read the state from the blockchain 150 and without having to contact the core layer 1201. This will reduce traffic with the core layer once the state has been recorded. The state could be queried from either the smart contract node 1202SC that originally recorded the state, or from any of the smart contract nodes 1202SC to which the state was propagated. The querying client node 1203C could be one of the parties to the smart contract or an interested third party. The query could be conducted directly over a connection within the layered network 1200 between the querying client node 1203C and the queried smart contract node 1202SC, or indirectly via more than one hop within the layered network 1200.

In another example scenario, a client node 1203C or another smart contract node 1202C may query the state of the smart contract from both a smart contract node 1202SC and a core layer node 1201, and compare the results to check that there is consensus. Again the querying may be performed via direct connections between the relevant pairs of nodes 1201, 1202SC, 1203C within the layered network 1200, or indirectly via more than one connection (more than one hop).

The smart contract state may be recorded in the first transaction in any one or more of a variety of possible forms. In embodiments it may be recorded explicitly in a payload of the transaction. Alternatively the state could be recorded in the payload in a transformed form, such as a hash. In the case of a hash or such like, this in itself only allows a node to check that the state has been recorded given knowledge of the expected state (a node cannot view the state from the record). This may be referred to as a "hash commit" of the state. However, in embodiments the existence of a state transaction in the UTXO set may also be taken as indicative of what state the contract exists in; i.e., this is a continuous, not a discrete, event.

The payload may be included in an unspendable output of the transaction. For example, the output may be made unspendable by including an opcode that terminates the respective locking script, e.g. OP_RETURN if using the Script language (optionally also including OP_FALSE preceding the OP_RETURN in the locking script). However, other transaction protocols or scripting languages may provide other means for including application-level payloads (i.e. user data) in transactions.

In another example of state information, one or more parties to the smart contract may be recorded in one or more outputs. This could be recorded in payloads of one or more unspendable outputs (e.g. using OP_RETURN or OP_FALSE OP_RETURN), or alternatively by locking one or more spendable output to the party or parties in question. For example, one output may be locked to party A and another to party B, to record that A and B are parties to the transaction; or one output may be locked to party A and one output may be locked to party T, where T is a trustee of the contract and an operator of the smart contract node 1202SC. In such cases the public key in the locking script acts as an indicator of the party to the smart contract. At the blockchain level the key is used for the standard purpose of verifying the unlocking script of any transaction attempting to spend the first transaction, but at the application level (i.e. as interpreted by the smart contract service and/or client software) the key is used to indicate a state of the contract (e.g. assignor or assignee).

In another example of state information, one of the outputs of the transaction may comprise a state puzzle, requiring a solution to the state puzzle to unlock. A set of one or more rules for forming the state puzzle may be stored at one of the smart contract nodes 1202SC. The smart contract node 1202C may be arranged to formulate at least the state puzzle part of the first transaction based on this set of rules as stored at the smart contract node 1202SC. Some examples of this will be discussed in more detail later.

In embodiments, a change in the state of the smart contract may be recorded using a second transaction, e.g. to record that the smart contract has expired, or to record a change of ownership of a right represented by the contract (e.g. a bond or such like). The second transaction may be formulated and recorded in a similar manner to any of the techniques described above in relation to the first transaction. The new state may be recorded in the second transaction in any of the ways discussed above in relation to the first transaction.

In some such embodiments, the first and second transactions simply sign two unrelated source transactions (the first and second transactions are not chained together). In this case the change in state may be simply represented at the application level, rather than at the blockchain level, by the information included in the application payload (e.g. OP_RETURN output) of the two transactions. The application level interpretation is assigned to the transactions by the smart contract service and clients thereof.

In other embodiments however, the second transaction does spend an output of the first transaction. Particularly, the first transaction may include an output comprising a state puzzle, and the second transaction includes an input pointing to that output. The second transaction is required to include a solution to the state puzzle to unlock the output of the first transaction. At the blockchain level this is a requirement for validating the second transaction for recordal on chain. At the application level it is also taken as a condition for recognizing the change of state. The smart contract node(s) 1202SC may only record the change in state in their local records of the smart contract state on condition that the second transaction provides the solution to the state puzzle.

In embodiments these two different mechanisms for recording a change in state may both be used, each to record a different tier of state information: the state puzzle mechanism is used to record a change in a primary state of a smart contract in one pair of first and second transactions, and the OP_RETURN payload mechanism is used to record a change in a secondary state of the smart contract in another pair of first and second transactions. E.g. the primary state may comprise whether a right such as a bond is live or expired, and the secondary state may comprise a current ownership of the right. In such cases parallel states exist in unison, In embodiments one state can trigger another to change state. For instance in the case of primary and secondary states, changes in the primary state may impact the secondary state (but not vice versa). An example of implementing primary and secondary states and changes thereto will be discussed in more detail later.

In embodiments the smart contract service may be implemented in conjunction with an ordering mechanism, such as the previously described ordering service, in order to determine a definitive order in which to apply state changes. This may be useful for example in a situation where different state changes in respective of the same smart contract are being received from different client nodes 1203 and/or propagated between different smart contract nodes 1202SC.

In some scenarios, multiple requests to update the same smart contract may be received at the same smart contract node 1202SC. To accommodate this, the smart contract node 1202SC may be configured to apply the state changes in a specified order. In some embodiments, the specified order could be based on a time of receipt at the receiving smart contract node 1202SC, or a timestamp added by the sending client node 1203C or a forwarding smart contract node 1202SC. Alternatively, the specified order could be asserted in one or more requests from one of the client nodes 1203C, or in a message from another intermediate layer node 1202 such as another of the smart contact nodes 1202SC or an attestation service node 702A, or from the core 1201. E.g. the order could be asserted in the form of an ordered list of the multiple updates, or an index of the order mapped to each update request.

In embodiments, the specified order may be recorded on the blockchain 150, e.g. by the attestation service 702A discussed previously. In such embodiments, the client node 1203C initiating the change in state may obtain an order from the attestation service 702A and submit this to the smart contract node 1202SC. In this case, as well as recording the order on the blockchain 150, the order attestation service 702 also returns a message comprising the specified order to the requesting client node 1203C (which is also a client 703C of the attestation service 702A). When the client 1203C makes a requests to the smart contract node 1202SC to change the state of the smart contract, it also submits the order it obtained from the attestation service 702A. The smart contract node 1202SC checks this against the order recorded on the blockchain (or in a miner's mempool 154) and then applies the updates in the specified order on condition that the order submitted by the client 1203C matches the order recorded on chain 150. The check may be conducted directly via the connection between the smart contract node 1202SC and the core 1201, or alternatively via more than one hop.

Alternatively the smart contract node 1202SC recording the state changes could read the order directly from the blockchain 150 and apply the order as read from the blockchain 150 (or miner's mempool 154).

In another variant, the attestation service 702A could be integrated into one or more of the smart contract nodes 1202SC. In this case one of the smart contract nodes 1202SC takes responsibility for determining the order (and optionally adding the timestamps), and recording this on the blockchain 150. The smart contract node 1202SC responsible for the order may propagate the specified order to other smart contract nodes 1202SC around the connections between nodes in the intermediate layer(s). The other smart contract nodes 1202SC may check this against the order recorded in the blockchain, or alternatively may read the order directly from the blockchain 150 (or in a miner's mempool 154). This may be conducted directly via the connection between the smart contract node 1202SC and the core 1202, or alternatively via more than one hop.

To illustrate some of the principles behind the disclosed scheme, a particular implementation will now be described by way of example. By way of illustration reference will be made to smart contract nodes being implemented in layer 2 and client (user) nodes in layer 3, but this could be generalised to any intermediate and outer layers respectively.

The following presents a use case for blockchain-based deterministic finite automata (DFA) using layers of overlay networks. The network topology follows that prescribed by the blockchain layered network (BLN) 1200 described above, in which the core network consists of full blockchain clients and outer shells consist of Simplified Payment Verification (SPV) nodes. These secondary SPV nodes adhere to a special set of sub-rules within the boundaries set by the proof-of-work consensus established in the core. Secondary nodes do not need to retain a copy of the blockchain, but instead can utilise the SPV paradigm to propagate state transitions according to some external data. The network layers can be identified using digital certificates or node versioning. An example use case will be described that allows different users in primary and secondary financial markets to trigger different states using smart contract nodes connected in a BLN topology.

Terminology: the following describes some terminology that will be used in the example use case.

Markets:

Primary market—the issuance of stocks or bonds to the public directly from the issuing entity (corporation or government) is considered as the primary market. Investment banks handle these transactions and investors in the primary market are usually large, institutional buyers who purchase millions of securities at a time. Sales prices are set low since the initial demand is hard to predict; this makes the primary market is very volatile. There is an elaborate regulatory process for the issuing financial institution to sell securities in the primary market.

Secondary market—all transactions of a security from the issuer takes place in the secondary market between investors. This can take place in stock exchanges (e.g., NASDAQ) or over-the-counter (debt securities). The price of shares is determined by the supply and demand of buyers and sellers, while in the primary market the initial price is set by the issuing entity. After large institutional buyers purchase large blocks of securities in the primary market, some buyers will subsequently sell shares in the secondary market to make a profit and any size investor can get involved. Though stocks are one of the most traded securities, investment banks along with corporate and individual investors trade mutual funds and bonds on secondary markets, while some entities also purchase mortgages on a secondary market.

Over-the-counter—decentralized dealer networks are the private alternative to centralised public exchanges. Non-standard quantities can be sold here and there is less public transparency compared to exchanges since prices are not disclosed until after a trade is complete. Debt securities are generally traded in the over-the-counter (OTC) secondary market by investment banks, primarily due to their diversity compared to stocks. Broker dealers negotiate with each other over computer networks, often matching client buys and sells internally. Bond prices are affected by changing interest rates and credit ratings. OTC trades are most beneficial in the liquidity that they provide, giving ample protection to investors looking to sell bonds before maturity. However, the trade is executed directly between two parties so it is not overseen or subject to the rules of major exchanges, which can be viewed as controversial.

Financial Entities:

Miners—full blockchain clients that store, record and update transactions on the Bitcoin blockchain using the proof-of-work (PoW) consensus mechanism.

Bond Issuer—corporation or governmental body issuing a new debt security to investors or lenders.

Underwriter—institutional investors e.g., investment banks that act as lenders to bond issuers.

Bond dealers—while investors can trade marketable bonds among themselves, trading is usually done through bond dealers, or more specifically, the bond trading desks of major investment dealers. These dealers are at the centre of a vast network of telephone and computer links that connect all the interested players. They also have traders responsible for knowing all about a group of bonds and quoting a price to buy or sell them, or "making a market" for bonds. Dealers provide "liquidity" for bond investors so that those investors can buy and sell bonds more easily and with a limited concession on the price, but dealers can also buy and sell amongst themselves, either directly or anonymously through bond brokers.

Bond investors—users that purchase bonds. Depending on the size of the investor, bonds can be purchased from a dealer in the secondary OTC market or from the underwriter directly.

Brokers—brokerages in the secondary market enable anonymous trades between bond dealers.

Bond Trustee—a bond trustee or a fiscal agent is a trusted third party hired by the bond issuer to enforce conditions outlined in the financial contract between a bond issuer and the bondholder. The trustee represents the interests of the bondholder.

Financial Contracts:

Bond Purchase Agreement—a contract that stipulates the sale conditions between the bond issuer and the underwriter, following a private negotiation in the primary bond market. New debt securities are not for sale to the general public, but instead are sold directly to underwriters.

Trust Indenture—a contract that stipulates the sale conditions between a bond issuer and an investor i.e., the bondholder, following a successful trade between relevant actors in the secondary bond market. While a bond purchase agreement is between the issuer and the underwriter of the new issue, a trust indenture is a contract between the issuer and the trustee who represents the interests of the investors.

Blockchain-based deterministic finite automata: a deterministic finite automaton (DFA) is a finite-state machine that accepts or rejects a given string of symbols by running through a state sequence uniquely determined by the string. Given a state and an input, there is only one new state (possibly the same one) that can occur, making the outcome of the calculation (e.g. of a contract) unique.

In WO/2018/078584, the states of the DFA are associated with unspent transaction outputs (UTXO) on the blockchain. Note that the blockchain network continuously tracks all available UTXO. WO/2018/078584 uses an example of a zero-coupon bond (ZCB) to implement state transitions. This is a debt security that is sold at a heavily discounted price to an investor, who does not receive any coupons (interest payments) until bond maturity, i.e. the full-face value is paid at some point in the future. A ZCB can be a corporate, municipal or treasury (government) bond and is considered a form of long-term investment. Due to the absence of periodic interest payments, a ZCB is easy to implement as a DFA since the financial contract only requires simple state transitions (initial set-up and final payment or default). Table 1 summarises the key features of a ZCB contract.

TABLE 1

Key features of a zero-coupon bond contract.

| Pros | Cons |
|---|---|
| Deep discount of sale price | No periodic interest payments |
| Fixed income guaranteed | Income tax payable on annual 'phantom' interest |

TABLE 1-continued

| Key features of a zero-coupon bond contract. | |
|---|---|
| Pros | Cons |
| Long-term maturity | Potentially low interest due to price fluctuations<br>Risk of default (corporate bonds) |

DFA transition table: A DFA is defined as a finite set $\{S, I, t, s_0, F\}$ with the following elements:

S is the finite set of possible states in which the machine can be,

I is a finite set of inputs that embodies the occurrence of any event or condition in relation to the contract e.g., a payment is made, the maturity of the instrument is reached, a counterparty defaults and so on, t: $S \times I \rightarrow S$ is the transition function, $s_0$ is an initial state, and $F \subseteq S$ is the set of all possible final outcomes.

Once all the above elements have been established, the DFA is completely defined by a transition table in which the future states for all possible current states and inputs are specified.

Table 2 shows the transition table for a ZCB contract. The possible states are defined as $S=\{s_0, f_0, f_1\}$ indicating, the holding state ($s_0$), and the final states of the system $F=\{f_0, f_1\}$ the normal conclusion (if it follows the 'happy path') or happy ending ($f_0$), and a state ($f_1$) in which things go wrong e.g. litigation.

The inputs that are considered are $I=\{r, d, e\}$ indicating, repayment of the principal at (or before) expiration (r), default of the issuer at (or before) expiration (d), and expiration of the contract without repayment (e)

TABLE 2

| Transition table for a zero-coupon bond contract. | | | |
|---|---|---|---|
| | r | d | e |
| $s_0$ | $f_0$ | $f_1$ | $f_1$ |

Figure 13:
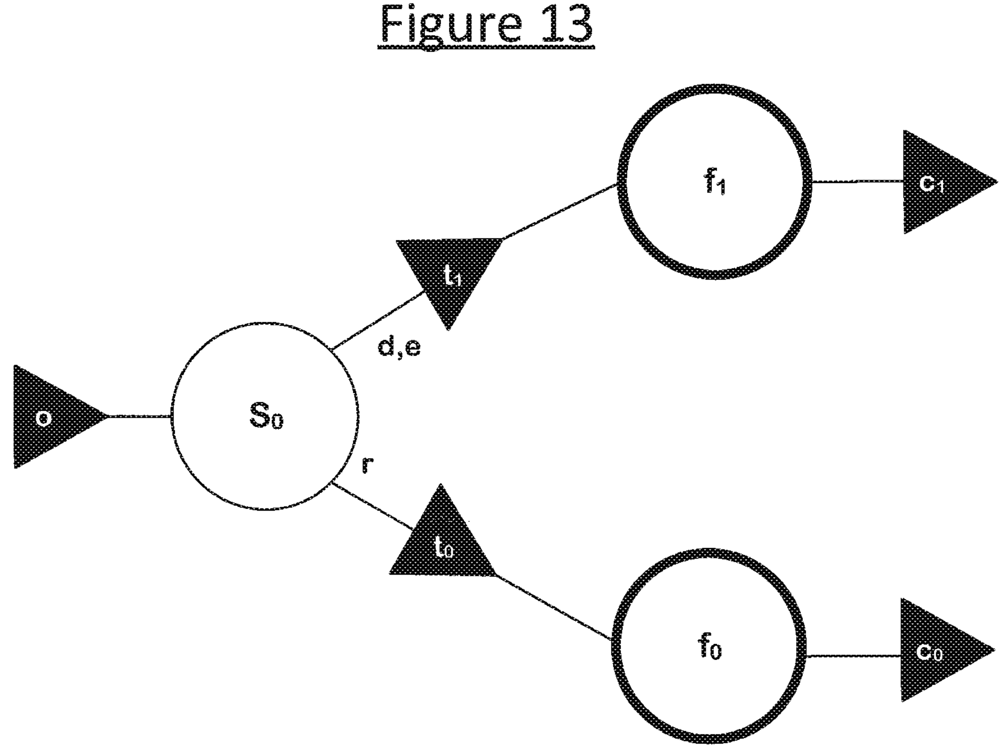
FIG. 13 is a schematic diagram describing a blockchain-based DFA for a zero-coupon bond contract.

FIG. 13 illustrates transitions from the holding state to one of the two final states. The mechanism by which the DFA moves from one state to another may be incarnated by blockchain transactions; effectively they spend the UTXO associated with one state (an input of the transaction) and create the UTXO associated with the next state (an output). The 'origination' transaction (o), 'transition' transactions ($t_0$, $t_1$) and 'completion' transactions ($c_0$, $c_1$) are represented by blue triangles in the schematic.

Blockchain-Layered Network for Smart Contracts: The present disclosure uses a blockchain layered network (BLN) (e.g. 1200) as described earlier to enhance the states in a DFA system such as those defined for a ZCB in WO/2018/078584.

In some embodiments, the system may adopt a Simplified Payment Verification (SPV) paradigm whereby nodes outside the core layer 1201 only forward specific transactions according to the SPV protocol. The system of specialised smart contract nodes 1202SC is linked to the core blockchain network 106 of 'mining nodes' 104, which reach consensus according to their proof of work (PoW), while the former establishes a second layer of consensus (PoW or some other method). This means that transactions constructed by secondary nodes remain valid on the main blockchain system. A smart contract node 1202SC can forward state and conditions as per a defined state table (external data). If the format is not the same, the state transition is rejected by the intermediate and/or outer layers of the layered network 1200.

In WO/2018/078584, ZCB states are derived from the creation and expiry of the bond, i.e. the outcome once the bond reaches maturity. However, ZCBs can be restrictive since they are a long-term investment. An investor may therefore opt to sell their bond in the secondary market.

Figure 14:
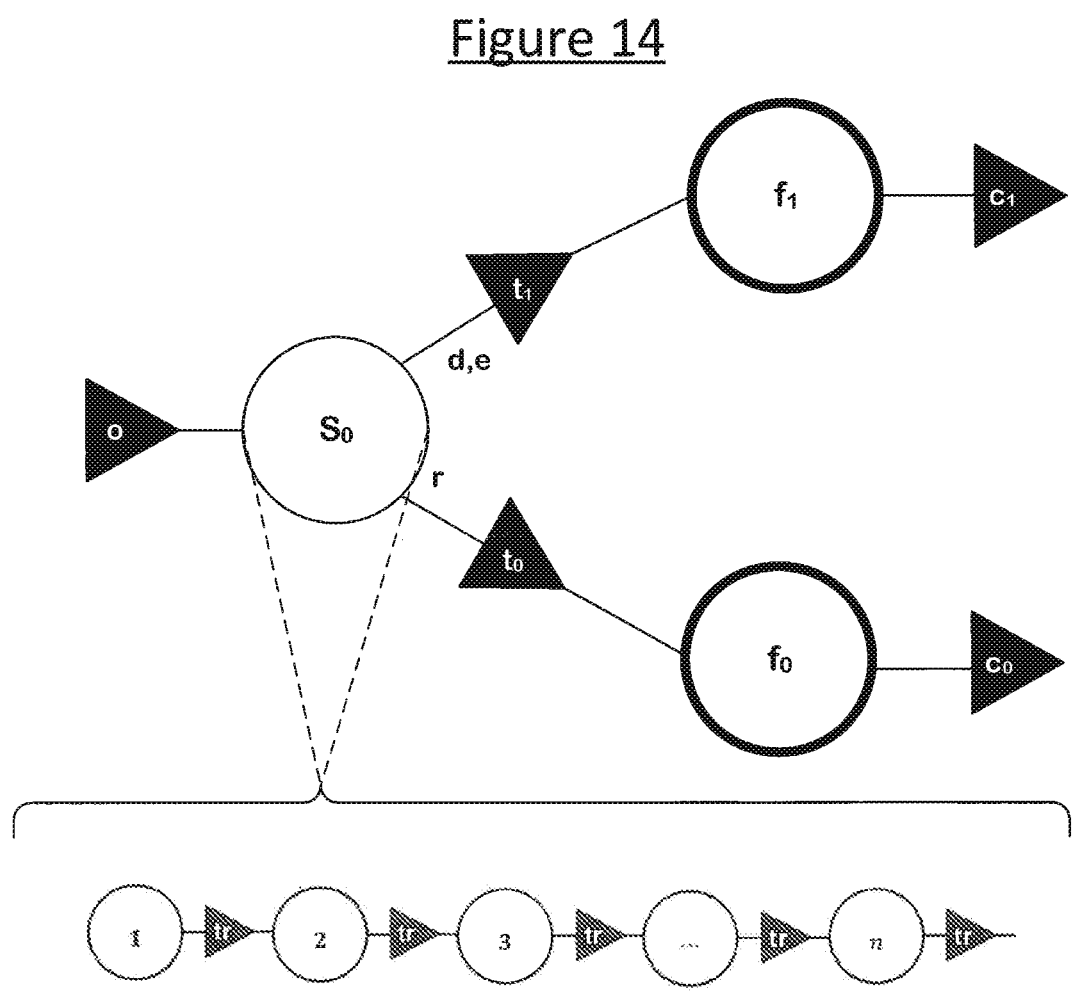

Note that such trades do not affect the states in the underlying DFA transition table, i.e. the states defined by the creation and expiry of a new debt security. However, there is a dependence in the opposite direction i.e., changes to the state of the DFA impact trades in the marketplace. FIG. 14 illustrates how the different states exist in parallel.

FIG. 14 illustrates the secondary state (curly brace) arising from n trades of a zero-coupon bond, which is currently in its primary holding state (top) as defined by a blockchain-based DFA.

Smart contracts: a smart contract is simply a contract that uses software to facilitate, verify or enforce the negotiation or performance of some or all parts of a contract. In an output-based (e.g. UTXO-based) model, a smart contract entity is a node that connects to the blockchain.

In an 'SPV' paradigm, nodes outside the core 1201 may not be able to 'listen' to the blockchain, other than using standard SPV protocol, since this would require a service level agreement with a mining node to send them specific transactions, which is not a lightweight solution. Note that if accounts do not exist, signing keys may be continuously updated, then it becomes challenging to identify transactions that may be relevant to the smart contract by simply scanning the blockchain.

In embodiments disclosed herein, users of a smart contract send transactions to smart contracts directly. Similarly, if a smart contract is triggered to create a transaction it is sent directly to the user. (Both the user's and smart contract's transactions should also be independently sent to the blockchain.)

For robustness, an entire layer of smart contract nodes may be required (layer 2 in our network construction). Smart contract transactions are propagated around this layer so that the smart contract state can be consistent.

One reason to use a blockchain layered network (BLN) is to be able to implement smart contracts. Preferably there will be more than one smart contract node 1202SC for robustness and load balancing, and users in layer 3 will send transactions directly to the smart contract in layer 2 so that the system is SPV friendly.

The smart contract node 1202SC may take a part of the transaction fee. All smart contract nodes may act together.

Layer 2 and/or 3 nodes may propagate transactions around the community because they would all like to agree upon the state of the smart contract.

Layer 2 and/or 3 nodes may issue a digital certificate identifying themselves and the rules of the contract. This could be a permissionless system where nodes are happy for people to enter since they pay a fee per transaction.

Network topology: a summary of an example network topology is provided in Table 3 below. The miners operate full nodes, while the smart contracts and users operate SPV nodes, and they reach consensus based on hash power (PoW). The smart contract nodes reach consensus using hash puzzles that are derived from details outlined in the private Bond Purchase Agreement (BPA). The users reach consensus on trades in the marketplace using UTXO set membership to represent active bondholders and transactions containing digital certificates drafted from the Trust Indenture (TI).

TABLE 3

| Description of example roles in the BLN. | | | | | |
|---|---|---|---|---|---|
| Layer | Entities | Client | Consensus mechanism | | State |
| 1 | Miners | Full | Public | Hash power (PoW) | N/A |
| 2 | Smart Contracts | Light | Private | Hash puzzles (BPA) | Primary |
| 3 | Users | Light | Public | UTXO set membership (TI) | Secondary |

Figure 15:
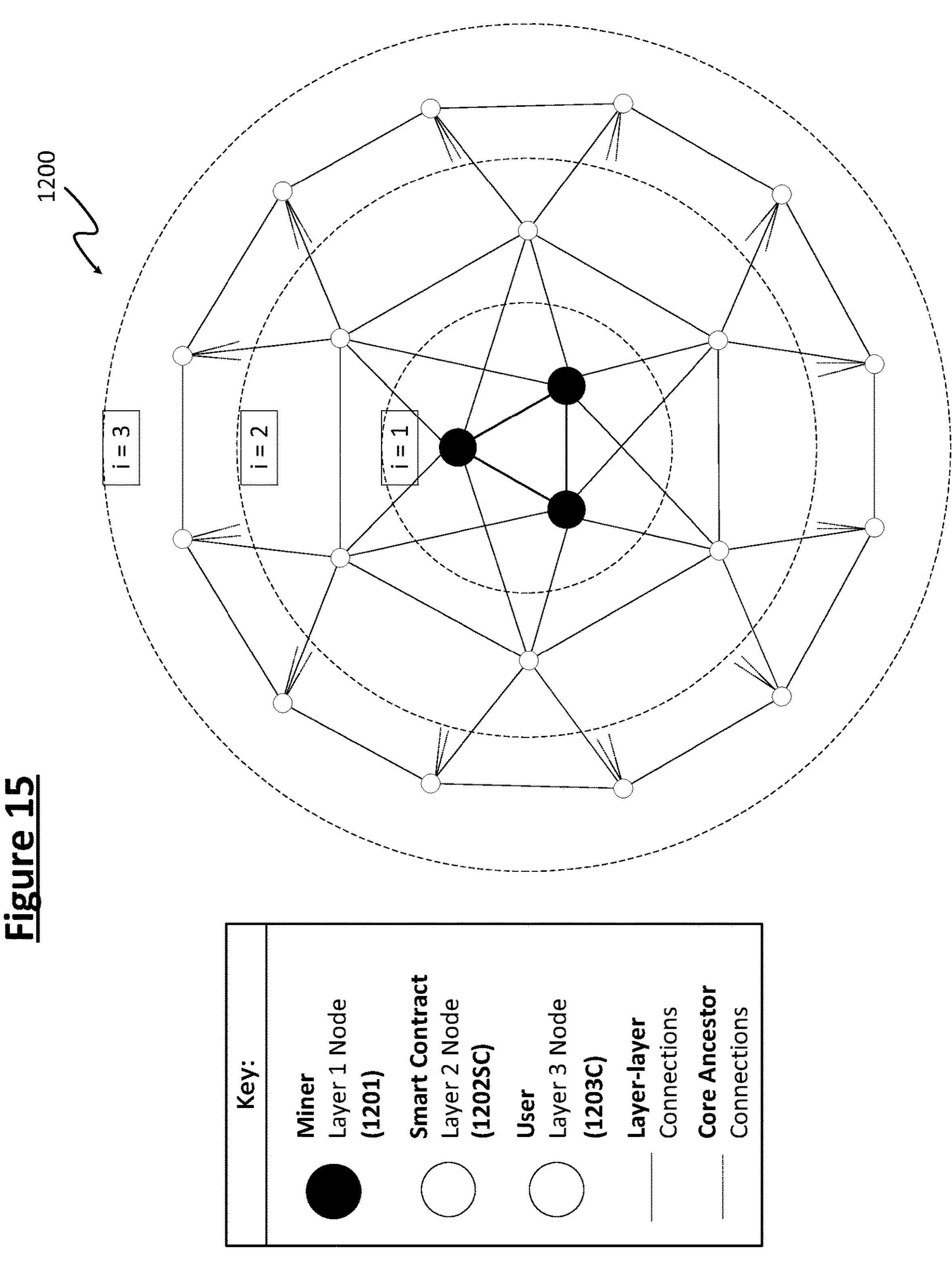
FIG. 15 schematically illustrates a blockchain layered network (BLN) consisting of miners, smart contracts and users in layers 1 to 3, respectively.

FIG. 15 illustrates the entities specified in Table 3 as nodes connected in a BLN topology. Financial entities transacting in both primary and secondary markets appear as users in layer 3. Multiple smart contract nodes are therefore desirable to support load balancing when different users interact with each other.

Multiple communities may also form on account of the different types of financial contracts that can be traded in the secondary markets. For example, one type of ZCB arises from 'strip' bonds. This is when the investment bank strips the coupon from the bond and sells them individually i.e., the strip bond residual and the coupon are traded separately in the secondary market. Both are tied to the same underlying states that define the lifetime of the bond, although different smart contracts are required to reflect the difference in the trust indentures (i.e. different agreements with bondholders).

Bond issuance, trade & settlement process: Table 4 below lists the actors in an example set-up.

TABLE 4

| Actors operating in different financial markets. | | |
|---|---|---|
| Layer | Actors | Public key |
| 1 | Miner | — |
| 2 | Bond trustee-Trudy | $P_T$ |
| 3 | Corporate bond issuer-Alice | $P_A$ |
| | Investment bank manager-Bob | $P_B$ |
| | Bond dealer-Dean | $P_D$ |
| | Brokerage-Brock | — |
| | Bond investor-Ivan | — |

Figure 16:
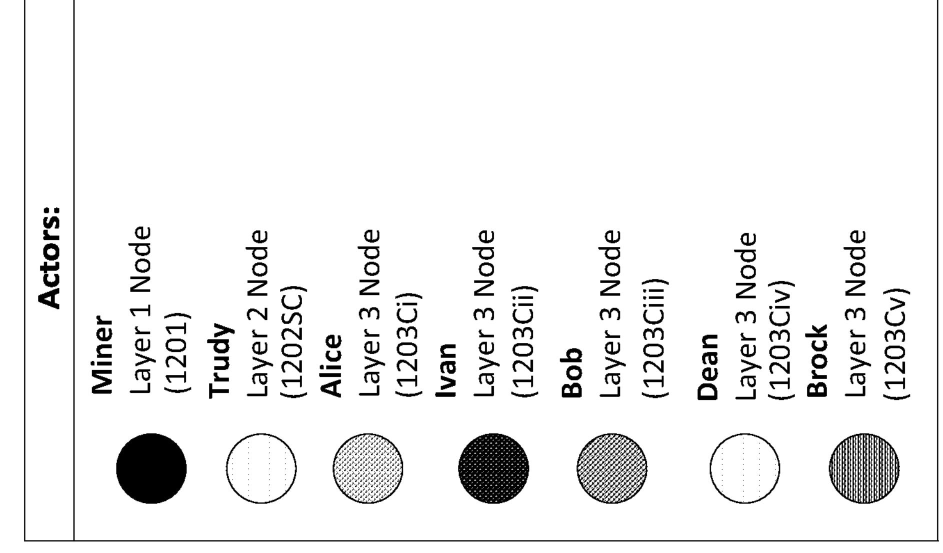
FIG. 16 schematically illustrates a community of nodes connected in a BLN topology.

FIG. 16 shows a community of nodes connected in a BLN topology.

Figure 17:
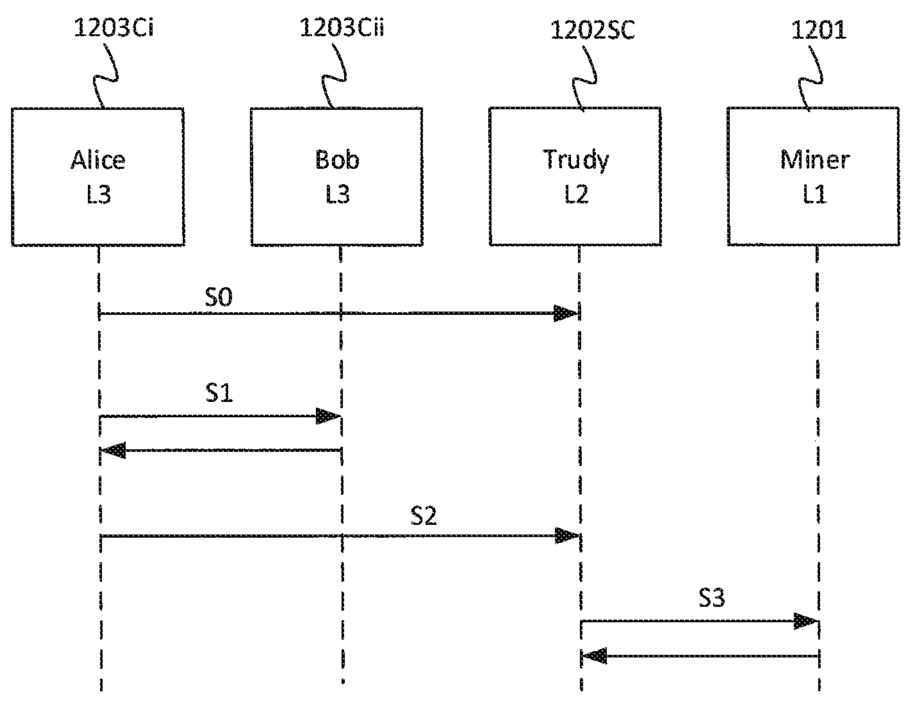
FIG. 17 is a schematic sequence diagram showing a first stage in an example method.
Figure 18:
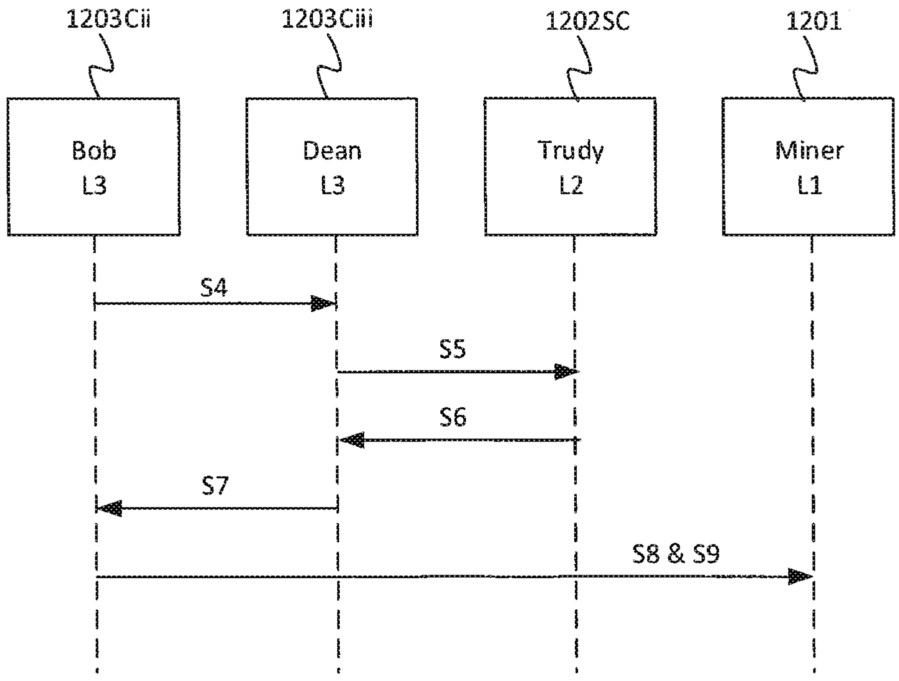
FIG. 18 is a schematic sequence diagram showing a second stage in an example method.

Some example methods of using a BLN to record smart contract state and changes in state are now described with reference to FIGS. 17 to 19.

Phase I— Creation of a new debt security. This is an example of recording a primary state. Reference is made to FIG. 17.

Step S0: Alice hires Trudy as part of the financial team at ABC Inc. to create the DFA structure and deploy smart contract nodes that are linked to this external data.

Step S1: Bob underwrites the new debt security in a BPA following private negotiations with Alice.

Step S2: Alice sets up and broadcasts an origination transaction $TxID_o$ based on the terms set out in the BPA.

Step S3: The smart contract nodes check the UTXO set for $TxID_o$ to mark the beginning of state $s_0$ according to the DFA transition table. In some embodiments, as illustrated in the Figure, this may optionally comprise the smart contract node (Trudy) querying a core node for the UTXO set. However this is not limiting and it is not necessarily required to connect with a mining node or other core node to check the UTXO set. For example Trudy may maintain her own copy of the UTXO set locally on the smart contract node.

Phase II—Trading in the market place. This is an example of recording a secondary state. Reference is made to FIG. 18.

Step S4: Bob creates a trade transaction template $TxID_{tr}$, to initiate the sale of a bond to Dean in which he adds a spendable output to himself indicating the cost of the bond.

Step S5: Dean adds a spendable output to Trudy in the partially complete $TxID_{tr}$.

Step S6: Trudy signs the Trust Indenture (TI) embedded in a null data output.

Step S7: Dean signs the trade transaction by adding a payment input for the bond to $TxID_{tr}$. Step S8. Bob signs the trade transaction to authorise the sale of the bond.

Step S9. Bob (or Trudy) broadcasts the complete trade transaction to layer 1 nodes.

Steps S4 to S9 may be repeated for any layer 3 users trading bonds in the marketplace (e.g., Dean to Brock, Brock to Dean, Dean to Ivan etc).

Phase III— Reaching bond maturity or otherwise. This phase may involve recording a change of the primary and secondary state. Reference is made to FIG. 19.

Primary State:

Step S10: Trudy initiates a change of state in the financial contract by creating and broadcasting a transition transaction $TxID_{t_f}$ to signify that:

a. ABC Inc. will pay the principal value upon bond maturity (Input r→State $f_0$),
b. ABC Inc. is going to default on payment (Input d→State $f_1$), or
c. The contract is going to expire without repayment (Input e→State $f_1$).

Step S11: Trudy creates and broadcasts a completion transaction $TxID_{c_f}$ to signify the outcome of the financial contract.

a. If Step S10*a*->Trudy provides the relevant puzzle solution in $TxID_{c_0}$ to indicate that active bondholders will receive payment for the principal value of the bond.
b. If Step S10*b* or S10*c*->Trudy provides the relevant puzzle solution in $TxID_{c_1}$ to indicate termination of the contract without payment.

Secondary State:

Step S12: Trudy revokes UTXO set membership(s) in $TxID_{re}$.

a. If Step 11*a*->Trudy creates a payment transaction(s) to the bondholder(s).

Comments on Phase I: The trustee stores the transition table externally, creates the hash puzzles for each possible state of the DFA and distributes them securely to all agents that have permission to participate on the execution of the contract (i.e. the smart contract nodes).

Payment for the new debt security can be processed on- or off-chain. Note that if on-chain, this transaction is independent (i.e. not chained) to subsequent transactions since the creation of the BPA involves a private negotiation between the bond issuer and the underwriter.

Figures 19, 20:
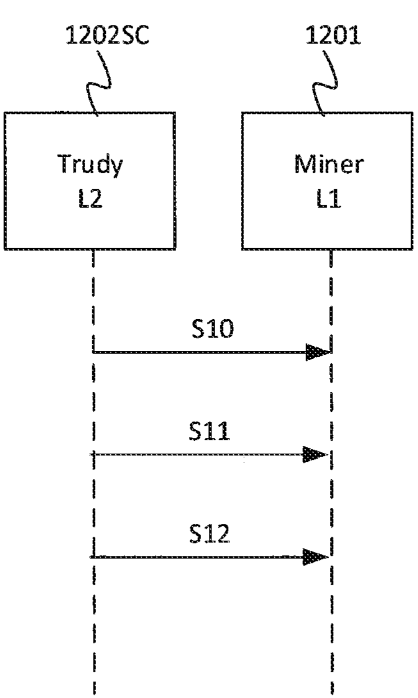
FIG. 19 is a schematic sequence diagram showing a third stage in an example method.
FIG. 20 is a schematic transaction diagram showing an example origination transaction.

FIG. 20 shows a schematic of an example origination transaction adapted from WO/2018/078584.

Conditions of the BPA are embedded in the locking script of the origination transaction shown in FIG. 20 as a hash puzzle given by:

```
Locking Script: OP_HASH256 <state s_i puzzle> OP_EQUAL
Unlocking Script: <puzzle s_i solution>
<state s_i puzzle> = H(< state s_i puzzle solution >)
<state s_i puzzle solution> = H (< contract code; state s_i; other data; salt >)
```

Once a solution is provided to the hash puzzle, the transaction will be considered spent. This triggers a change of state in the contract, which is broadcast and confirmed in the core blockchain network.

The difference in input and output values in FIG. 20 is the fee charged by the miners and the smart contract nodes (the latter is explicitly included as an output in the final transaction of FIG. 27).

Comments on phase II: the trade transaction can take the form of a Merchant Point of Sale Template and includes a null data output for the Trust Indenture contract, along with a spendable output to the trustee in order to:

(i) make use of UTXO set membership for active bondholders, and (ii) provide an economic incentive for the smart contract nodes to broadcast new investment details around the network (once the TI transaction is mined on the blockchain).

Note that the trustee will spend the output from the previous 'trading' transaction (if one existed) to indicate change of ownership according to UTXO set membership. The Trust Indenture contains the signatures of the bond issuer and the trustee on behalf of the new bondholder. An additional transaction input (for a minimal—dust amount) contains the seller's signature to show that the sale of the bond has been authorised by both parties. Note that in the OTC market, a new investor purchases bonds from a dealer and a dealer might purchase from a broker, who would both take a commission in addition to the fees sent to the trustee.

FIG. 21 is a schematic of the partially complete trade transaction at step S4. Bob has added a payment to himself for the sale of the bond.

FIG. 22 is a schematic of the partially complete trade transaction at step S5. Dean adds a spendable output addressed to Trudy to process any future trades, i.e. in this example UTXO set membership revocation.

FIG. 23 is a schematic of the partially complete trade transaction at step S6. Trudy drafts up and signs a Trust Indenture which is embedded as a digital certificate and includes a signature from the bond issuer.

FIG. 24 is a schematic of the partially complete trade transaction at step S7. Dean adds an input to pay for the bond.

FIG. 25 is a schematic of schematic of the complete trade transaction at step S8. Bob authorises the final trade and broadcasts it to the blockchain network (or sends to Trudy to broadcast).

Comments on Phase III: successive transitions on the execution of the contract are carried out by the smart contract nodes. They need to get the puzzle solution corresponding to the current state ($s_0$), interact with the world (external state e.g., bond maturity date) in order to receive the appropriate input, read the transition table (or just the part of them corresponding to the current state), and get the puzzle corresponding to the appropriate next state ($f_f$). They can then submit the transaction to the blockchain, if they succeed in placing it, they will get their fee and the DFA will be in the state $f_f$.

The difference in input and output values in FIG. 20 is the fee charged by the miners and the smart contract nodes, although the latter is explicitly included as an output in the final transaction of FIG. 27. The first output in FIG. 27 returns any unused funds to the originator (the bond issuer, Alice).

FIG. 27 is a schematic of the transition transaction adapted from WO/2018/078584.

FIG. 28 is a schematic of the UTXO set revocation transaction.

The above has illustrated a BLN topology to facilitate the use of smart contracts and blockchain-based DFAs or the like. Systems of specialised nodes operating under different consensus mechanisms are added into one network topology. Employing an SPV paradigm enables lightweight communication between nodes in different layers of the BLN. The idea has been exemplified in terms of a use case based on trading in financial markets to show how different users can effectively transact with each other and a smart contract node.

CONCLUSION

It will be appreciated that the above embodiments have been described by way of example only. More generally, there may be provided a method, apparatus or program in accordance with any one or more of the following Statements.

Statement 1: a method of maintaining a state of a smart contract in a layered network, the layered network comprising a core layer comprising one or more core nodes, one or more intermediate layers each comprising one or more intermediate layer nodes, and one or more outer layers each comprising one or more outer layer nodes; wherein each of the core nodes is a node of a blockchain network, one or more of the intermediate layer nodes are smart contracts nodes providing a smart contract service for maintaining the state of the smart contract, and one or more of the outer layer nodes are client nodes of the smart contract service; the method comprising, by a first one of the one or more smart contract nodes: recording a state of the smart contract in a record of the state maintained at the first smart contract node; wherein at least a first transaction also recording the state is recorded on a blockchain of the blockchain network.

It will be appreciated that "first" in this context is just an arbitrary label for a given one of the smart contract nodes, and does in itself not necessarily imply any particular status relative to the other smart contract nodes.

Statement 2: the method of Statement 1, wherein the one or more smart contract nodes are a plurality of smart contract nodes; and the method comprises, by the first smart contract node: propagating the state to a record of the state of the smart contract maintained at the other smart contract node, the propagating being performed over one or more connections between smart contract nodes within the one or more intermediate layers of the layered network.

Statement 3: the method of Statement 1 or 2, wherein the first transaction is transmitted by one of the client nodes to at least one of the core nodes to be recorded in the blockchain.

Statement 4: the method of any preceding Statement, wherein the method comprises, by the first smart contract node: transmitting the first transaction from the first smart contract node to at least one of the core nodes to be recorded on the blockchain.

Statement 5: the method of Statement 3, wherein the first transaction is transmitted directly to the at least one core node over at least one connection within the layered network between said one of the client nodes and the core layer.

Alternatively it could be transmitted via more than one hop.

Statement 6: the method of Statement 4, wherein the method comprises, by the first smart contract node: receiving the first transaction from said one of the client nodes at the first smart contract node; wherein said transmitting by the first smart contract nodes comprises forwarding the first transaction on to the at least one core node.

Statement 7: the method of Statement 6, wherein one or both of: said receiving is performed directly over a connection within the layered network between the first smart contract node and said one of the client nodes, and/or said forwarding is performed directly over at least one connection within the layered network between the first smart contract node and the core layer.

Alternatively, either or both of the receiving leg and the forwarding leg could be via more than one hop.

Statement 8: the method of any preceding Statement, wherein the first transaction is initiated by one of the client nodes.

Statement 9: the method of any of Statements 1 to 7, wherein the first transaction is initiated by the first smart contract node.

Statement 10: the method of any preceding Statement, wherein the record of the state maintained at at least one of the smart contract nodes is made available to at least one of the client nodes.

Statement 11: the method of Statement 10, wherein said making available enables the at least one client node to determine the state without needing to query the record on the blockchain.

Statement 12: the method of Statement 10 or 11, wherein the record is made available directly over a connection within the layered network between the at least one smart contract node and the at least one client node Alternatively this could be done via more than one hop.

Statement 13: the method of any of Statements 10 to 12, wherein the method comprises: the first smart contract node performing said making available, by the first smart contract node making the record of the state maintained at the first smart contract node available to the at least one client node.

This may be done directly over a connection within the layered network between the first smart contract node and the client node, or indirectly via more than one hop.

Statement 14: the method of any of Statements 10 to 13, as dependent on Statement 2, wherein the record maintained at at least one of the other smart contract nodes, to which the state is propagated, is made available to the at least one client node.

Again this may be done directly via a single hop in the layered network, or indirectly via multiple hops.

Statement 15: the method of any preceding Statement, wherein at least one of the smart contract nodes is arranged to inspect the record on the blockchain, or in a mempool of a miner, to confirm the state of the smart contract.

Statement 16: the method of Statement 15, wherein the at least one smart contract node is arranged to perform said inspecting directly over a connection within the layered network between the at least one smart contract node and at least one of the core nodes.

Statement 17: the method of Statement 15 or 16, wherein the method comprises the first smart contract node performing said inspecting.

Statement 18: the method of Statement 15, 16 or 17, wherein said inspecting is performed by another of the smart contract nodes, other than the first smart contract node.

Statement 19: the method of any preceding Statement, wherein at least one of the client nodes inspects the block chain, or a mempool of a miner, to confirm the state of the smart contract.

E.g. in embodiments this may be the secondary state, such as ownership. For instance client nodes may check the UTXO set for active bondholders.

Statement 20: the method of Statement 19, wherein said inspecting by the at least one client node is performed over a direct connection within the layered network between the client node and the core layer.

Alternatively this could be done via more than one hop.

Statement 21: the method of any preceding Statement, wherein the first transaction comprises one or more inputs, each comprising a cryptographic signature of a respective party to the smart contract.

Statement 22: the method of any preceding Statement, wherein an input of the first transactions comprises a cryptographic signature of an operator of the first smart contract node.

Statement 23: the method of any preceding Statement, wherein the first transaction comprises one or more outputs, each comprising a locking script locking the output to a respective party to the smart contract.

Statement 24: the method of any preceding Statement, wherein the first transaction includes an application-level payload comprising one or more terms of the smart contract.

Statement 25: the method of any preceding Statement, wherein the method comprises, by the first smart contract node: signing at least part of the payload including at least one of the terms with a cryptographic key associated with the first smart contract node.

Statement 26: the method of Statement 24 or 25, wherein the payload is included in an unspendable output of the first transaction.

In embodiments the unspendable output may be made unspendable by inclusion of an opcode in a respective locking script of that output which terminates the respective script. E.g. this may be the OP_RETURN opcode.

Statement 27: the method of any preceding claim, wherein said recording of the state in the record maintained at the first smart contract node comprises: recording a first state of the smart contract, and recording a change to the state of the smart contract, being a change compared to the first state; wherein the first state is recorded in a first transaction on the blockchain and the change in state is recorded in a second transaction on the blockchain.

Statement 28: the method of Statement 27, wherein the first transaction comprises an output comprising a respective locking script that comprises a state puzzle requiring a solution to the state puzzle to unlock the respective locking script; and wherein the method comprises, by the first smart contract node: using a set of rules stored at the first smart contract node to formulate the state puzzle based on said set of rules, and including the state puzzle in the first transaction prior to recordal on the blockchain; and recording the change in the state of the smart contract in the record maintained at the first smart contract node, on condition that the second transaction comprises an input that points to the respective output comprising the state puzzle and that said input provides a solution to the state puzzle.

Statement 29: the method of any preceding Statement, wherein the first transaction is negotiated between at least two of the client nodes over at least one connection within one or more outer layers of the layered network.

For instance this may comprise exchanging a template version of the first transaction. In embodiments, a first user of a first of the two client nodes agrees the template transaction with a second user of a second of the two client nodes. This may comprise adding a respective output locked to one of the parties as part of the negotiation. One of the two nodes may also add an output locked to an operator of the first smart contract node. One of the two client nodes then sends this template transaction to the first smart contract node to sign with a cryptographic signature associated with the smart contract node (e.g. signing the terms included in the payload). The first smart contract node then returns the signed template back to one of the first and second nodes, the user of which adds their signature (e.g. in an input) and sends to the other client node for the user of that client node to add their signature. One of the client nodes then sends the complete signed transaction, including all three signatures, to the core layer to be recorded on the blockchain. E.g. the party selling a right represented by the contract, such as a bond, may be incentivised to do this. This final sending step may be direct to the core, or via the first smart contract node which forwards it on to the core.

Statement 30: the method of any of Statements 2 to 7, 10 to 20 or 29, wherein communication between at least some nodes of the layered network, including one or more of said propagating, transmitting, receiving, forwarding, making available, inspecting and/or negotiating, is performed using a communication protocol.

In embodiments, said communication protocol may be a communication protocol in which messages take the form of: a) a transaction sent from client node to core node; b) a query from client node to core node as to whether a transaction has been accepted into a miner's mempool, and a corresponding response from the core node; c) a request from client node to core node for a Merkle proof that a transaction has been mined into a block, and a response from the core node comprising the Merkle proof; and/or d) a request from client node to core node for a list of block headers, and a response from the core node comprising the list of block headers.

In embodiments the relevant client node(s) and/or smart contract node(s) may be configured to use no more than a) to d) in communicating over the connection with the at least one core node.

In embodiments said protocol may be a SPV protocol.

In embodiments all communication between client nodes and smart contract nodes may use said protocol. In embodiments all communication among different client nodes may use said protocol. In embodiments all communication among different smart contract nodes may use said protocol. In embodiments all communication between client nodes and core nodes may use said protocol. In embodiments all communication between smart contract nodes and core nodes may use said protocol.

In embodiments all communication between outer layer nodes and intermediate layer nodes may use said protocol. In embodiments all communication among different outer layer nodes may use said protocol. In embodiments all communication among different intermediate layer nodes may use said protocol. In embodiments all communication between outer layer nodes and core nodes may use said protocol. In embodiments all communication between intermediate layer nodes and core nodes may use said protocol.

Statement 31: the method of any preceding Statement, wherein the recording of the state at the first smart contract node comprises recording a plurality of state changes, which are also recorded in one or more transactions on the blockchain, the one or more transactions comprising at least the first transaction; wherein the method comprises, by the first smart contract node: determining an order of the state changes, and applying the state changes in the record maintained at the first smart contract node according to said order.

Statement 32: the method of Statement 31, wherein the determining of said order comprises receiving the order from an ordering service implemented in one or more of the intermediate layer nodes of the layered network.

In embodiments, the ordering service nodes may be part of the same community as the first smart contract node.

Statement 33: the method of Statement 31 or 32, wherein the order is recorded on the blockchain.

Statement 34: the method of any preceding Statement, wherein the core layer is complete.

I.e. every core node in the core layer has a connection within the layered network to every other core node in the core layer.

Statement 35: the method of any preceding Statement, wherein the layered network as a whole is non-complete.

I.e. not every node in every layer has a connection within the layered network to every other node in every other the core layer. In some such embodiments every node within a given layer does not necessarily even have a connection to every other node in the same layer.

Statement 36: computer equipment comprising: memory comprising one or more memory units, and processing apparatus comprising one or more processing units; wherein the memory stores code arranged to run on the processing apparatus, the code being configured so as when run on the processing apparatus to operate the computer equipment as said first smart contract node by performing the method of any preceding Statement.

Statement 37: a computer program embodied on computer readable storage and configured so as when run on one or more processors to perform the method of any of Statements 1 to 35.

Statement 38: a method comprising: communicating information regarding a smart contract between two or more nodes of a first network using one or more message of a communication protocol; and causing a state of the smart contract to be stored in a record on a smart contract node of said network providing a smart contract service; wherein the state of the smart contract is also recorded on a blockchain of a blockchain network.

In embodiments said communication protocol may be a communication protocol in which the messages take the form of: a) transactions sent from client node to core node; b) queries from client node to core node as to whether transactions have been accepted into miners' mempools, and corresponding responses; c) requests for Merkle proofs that transactions have been mined into blocks, and responses comprising the Merkle proofs; and/or d) requests for lists of block headers, and responses comprising the lists of block headers.

In embodiments said communication protocol may be SPV.

In embodiments, the first network may comprise core nodes being nodes of the blockchain network and non-core nodes other than nodes of the blockchain network. The communication may be performed between the non-core nodes, or between one of the non-core nodes and one of the core nodes. The core non-core nodes may include the smart contract node. The communication may be between the smart contract node and one of the core nodes. The method may be performed by the smart contract node. The non-core nodes may include a client node being a client of the smart contract node. The communication may be between the client node and the smart contract node. The method may be performed by the smart contract node or the client node or a combination.]

In embodiments, said communication may comprise negotiate the smart contract, e.g. by exchanging a template version of the transaction. Said step of causing may be based, at least in part, on the communication, e.g. based on the negotiation. Alternatively or additionally, said communication may comprise querying the state of the contract, e.g. from the smart contract node or from one of the core nodes.

The transaction may be sent by the smart contract node or one of the client nodes to be recorded on the blockchain, e.g. by sending it to one of the core nodes.

Statement 39: computer equipment comprising: memory comprising one or more memory units, processing apparatus comprising one or more processing units, and a network interface comprising one or more network interface units; wherein the memory stores code arranged to run on the processing apparatus, the code being configured so as when run on the processing apparatus to operate the computer equipment to perform the method of Statement 38 including communicating the one or more messages via the network interface.

Statement 40: a computer program embodied on computer readable storage and configured so as when run on one or more processors to perform the method of Statement 38.

According to another aspect disclosed herein, there may be provided a method performed by a client node comprising the operations of any of the client nodes disclosed herein. According to further aspects there may be provided a client node configured to perform such a method, and a computer program for operating a node as a client node according to such a method. According to a further aspect the may be provided a method comprising the operations of any one or more of the smart contract nodes and any one or more of the client nodes. According to a yet further aspect there may be provided a corresponding system.

Other variants or use cases of the disclosed techniques may become apparent to the person skilled in the art once given the disclosure herein. The scope of the disclosure is not limited by the described embodiments but only by the accompanying claims.

The invention claimed is:

1. A method of maintaining a state of a smart contract in a layered network, the layered network comprising a core layer comprising one or more core nodes, one or more intermediate layers each comprising intermediate layer nodes, and one or more outer layers each comprising one or more outer layer nodes; wherein each of the core nodes is a node of a blockchain network, a plurality of the intermediate layer nodes are smart contracts nodes providing a smart contract service for maintaining the state of the smart contract, and one or more of the outer layer nodes are client nodes of the smart contract service; the method comprising, by a first one of the plurality of smart contract nodes:

recording a state of the smart contract in a record of the state maintained at the first smart contract node;

wherein at least a first transaction also recording the state is recorded on a blockchain of the blockchain network;

wherein the method further comprises making available to at least one of the client nodes, from the first smart contract node, the record of the state maintained at the first smart contract node, said making available enabling the at least one client node to determine the state without needing to query the record on the blockchain; and wherein the method further comprises, by the first smart contract node: propagating the state to a record of the state of the smart contract maintained at another smart contract node of the plurality of smart contract nodes, the propagating being performed over one or more connections between smart contract nodes within the one or more intermediate layers of the layered network.

2. The method of claim 1, wherein:

the first transaction is transmitted by one of the client nodes to at least one of the core nodes to be recorded in the blockchain; and wherein the first transaction is transmitted directly to the at least one core node over at least one connection within the layered network between said one of the client nodes and the core layer.

3. The method of claim 1, wherein the method comprises, by the first smart contract node:

transmitting the first transaction from the first smart contract node to at least one of the core nodes to be recorded on the blockchain; and receiving the first transaction from said one of the client nodes at the first smart contract node;

wherein said transmitting by the first smart contract nodes comprises forwarding the first transaction on to the at least one core node; and wherein one or both of:

said receiving is performed directly over a connection within the layered network between the first smart contract node and said one of the client nodes, and/or said forwarding is performed directly over at least one connection within the layered network between the first smart contract node and the core layer.

4. The method of claim 1, wherein the first transaction is initiated by the first smart contract node.

5. The method of claim 1, wherein the record is made available directly over a connection within the layered network between the first smart contract node and the at least one client node.

6. The method of claim 1, wherein the method comprises:

the first smart contract node performing said making available, by the first smart contract node making the record of the state maintained at the first smart contract node available to the at least one client node.

7. The method of claim 1, wherein the record maintained at the other smart contract node, to which the state is propagated, is made available to the at least one client node.

8. The method of claim 1, wherein at least one of the smart contract nodes is arranged to inspect the record on the blockchain, or in a mempool of a miner, to confirm the state of the smart contract.

9. The method of claim 1, wherein at least one of the client nodes inspects the blockchain, or a mempool of a miner, to confirm the state of the smart contract.

10. The method of claim 1, wherein said recording of the state in the record maintained at the first smart contract node comprises:

recording a first state of the smart contract, and recording a change to the state of the smart contract, being a change compared to the first state;

wherein the first state is recorded in a first transaction on the blockchain and the change in state is recorded in a second transaction on the blockchain.

11. The method of claim 1, wherein the first transaction is negotiated between at least two of the client nodes over at least one connection within one or more outer layers of the layered network.

12. The method of claim 8, wherein the first smart contract node is arranged to perform said inspecting directly over a connection within the layered network between the first smart contract node and at least one of the core nodes.

13. The method of claim 9, wherein said inspecting by the at least one client node is performed over a direct connection within the layered network between the client node and the core layer.

14. The method of claim 10, wherein the first transaction comprises an output comprising a respective locking script that comprises a state puzzle requiring a solution to the state puzzle to unlock the respective locking script; and wherein the method comprises, by the first smart contract node:

using a set of rules stored at the first smart contract node to formulate the state puzzle based on said set of rules, and including the state puzzle in the first transaction prior to recordal on the blockchain; and recording the change in the state of the smart contract in the record maintained at the first smart contract node, on condition that the second transaction comprises an input that points to the respective output comprising the state puzzle and that said input provides a solution to the state puzzle.

15. Computer equipment for maintaining a state of a smart contract in a layered network, the layered network comprising a core layer comprising one or more core nodes, one or more intermediate layers each comprising intermediate layer nodes, and one or more outer layers each comprising one or more outer layer nodes; wherein each of the core nodes is a node of a blockchain network, a plurality of the intermediate layer nodes are smart contracts nodes providing a smart contract service for maintaining the state of the smart contract, and one or more of the outer layer nodes are client nodes of the smart contract service; the computer equipment comprising, at a first one of the plurality of smart contract nodes:

memory comprising one or more memory units, and processing apparatus comprising one or more processing units;

wherein the memory stores code arranged to run on the processing apparatus, the code being configured so as when run on the processing apparatus, the processing apparatus operates the computer equipment as said first smart contract node by performing a method comprising:

recording a state of the smart contract in a record of the state maintained at the first smart contract node;

wherein at least a first transaction also recording the state is recorded on a blockchain of the blockchain network;

wherein the method further comprises making available to at least one of the client nodes, from the first smart contract node, the record of the state maintained at the first smart contract nodes, said making available enabling the at least one client node to determine the state without needing to query the record on the blockchain; and wherein the method further comprises, by the first smart contract node: propagating the state to a record of the state of the smart contract maintained at another smart contract node of the plurality of smart contract nodes, the propagating being performed over one or more connections between smart contract nodes within the one or more intermediate layers of the layered network.

16. A computer program product for maintaining a state of a smart contract in a layered network, the layered network comprising a core layer comprising one or more core nodes, one or more intermediate layers each comprising intermediate layer nodes, and one or more outer layers each comprising one or more outer layer nodes; wherein each of the core nodes is a node of a blockchain network, a plurality of the intermediate layer nodes are smart contracts nodes providing a smart contract service for maintaining the state of the smart contract, and one or more of the outer layer nodes are client nodes of the smart contract service; the computer program being embodied on a non-transitory computer readable storage medium and configured so as when run on one or more processors, at a first one of the plurality of smart contract nodes, the one or more processors performs a method comprising:

recording a state of the smart contract in a record of the state maintained at the first smart contract node;

wherein at least a first transaction also recording the state is recorded on a blockchain of the blockchain network;

wherein method further comprises making available to at least one of the client nodes, from the first smart contract node, the record of the state maintained at the first smart contract nodes, said making available enabling the at least one client node to determine the state without needing to query the record on the blockchain; and wherein the method further comprises, by the first smart contract node: propagating the state to a record of the state of the smart contract maintained at another smart contract node of the plurality of smart contract nodes, the propagating being performed over one or more connections between smart contract nodes within the one or more intermediate layers of the layered network.

* * * * *